United States Patent
Minamibayashi et al.

(10) Patent No.: US 12,199,324 B2
(45) Date of Patent: Jan. 14, 2025

(54) COMPOSITE ELECTROLYTE MEMBRANE, ELECTROLYTE MEMBRANE HAVING CATALYST LAYER ATTACHED THERETO, MEMBRANE-ELECTRODE COMPOSITE, SOLID POLYMER-TYPE FUEL CELL, AND METHOD FOR PRODUCING COMPOSITE ELECTROLYTE MEMBRANE

(71) Applicant: TORAY INDUSTRIES, INC., Tokyo (JP)

(72) Inventors: Kenta Minamibayashi, Otsu (JP); Tomoyuki Kunita, Otsu (JP); Daisuke Ogata, Otsu (JP); Daisuke Izuhara, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 33 days.

(21) Appl. No.: 17/640,959

(22) PCT Filed: Sep. 11, 2020

(86) PCT No.: PCT/JP2020/034420
§ 371 (c)(1),
(2) Date: Mar. 7, 2022

(87) PCT Pub. No.: WO2021/054253
PCT Pub. Date: Mar. 25, 2021

(65) Prior Publication Data
US 2022/0336836 A1      Oct. 20, 2022

(30) Foreign Application Priority Data

Sep. 20, 2019   (JP) ................................ 2019-171868

(51) Int. Cl.
*H01M 8/1039*   (2016.01)
*H01M 8/1004*   (2016.01)
(Continued)

(52) U.S. Cl.
CPC ....... *H01M 8/1039* (2013.01); *H01M 8/1004* (2013.01); *H01M 8/1058* (2013.01); *H01M 8/1081* (2013.01)

(58) Field of Classification Search
CPC ............. H01M 8/1039; H01M 8/1041; H01M 8/1044; H01M 8/1046; H01M 8/1051;
(Continued)

(56) References Cited

U.S. PATENT DOCUMENTS

| | | |
|---|---|---|
| 2018/0053956 A1 | 2/2018 | Yamaguchi et al. |
| 2021/0005912 A1 | 1/2021 | Kunita et al. |

FOREIGN PATENT DOCUMENTS

| | | | |
|---|---|---|---|
| CA | 2976892 A1 | * | 9/2016 |
| JP | 2005-68396 A | | 3/2005 |

(Continued)

OTHER PUBLICATIONS

International Search Report, issued in PCT/JP2020/034420, PCT/ISA/210, dated Nov. 17, 2020.
(Continued)

*Primary Examiner* — Basia A Ridley
*Assistant Examiner* — Heng M. Chan
(74) *Attorney, Agent, or Firm* — Birch, Stewart, Kolasch & Birch, LLP

(57) ABSTRACT

A composite electrolyte membrane having a composite layer that is a composite of a hydrocarbon polymer electrolyte and a fluorine-containing polymer porous substrate, wherein a fractal dimension D exhibiting the distribution of the hydrocarbon polymer electrolyte and the fluorine-containing polymer porous substrate in the composite layer is 1.7 or more. An object of the present invention is to enable a composite electrolyte membrane composed of a hydrocarbon polymer
(Continued)

White: Electrolyte,
Black: Reinforcement Material electrolyte and a fluorine-containing polymer porous substrate to achieve high proton conduction ability and high mechanical durability.

11 Claims, 4 Drawing Sheets

(51) Int. Cl.
*H01M 8/1058* (2016.01)
*H01M 8/1081* (2016.01)

(58) Field of Classification Search
CPC ............. H01M 8/1058; H01M 8/1004; H01M 8/1081; H01M 8/1062
See application file for complete search history.

(56) References Cited

FOREIGN PATENT DOCUMENTS

| | | | | |
|---|---|---|---|---|
| JP | 5059256 B2 | * | 10/2012 | |
| KR | 20110035124 A | * | 4/2011 | |
| WO | WO-2014112497 A1 | * | 7/2014 | ............. C08G 61/10 |
| WO | WO 2016/148017 A1 | | 9/2016 | |
| WO | WO 2019/188572 A1 | | 10/2019 | |

OTHER PUBLICATIONS

Written Opinion of the International Searching Authority, issued in PCT/JP2020/034420, PCT/ISA/237, dated Nov. 17, 2020.

* cited by examiner

[Fig. 1]
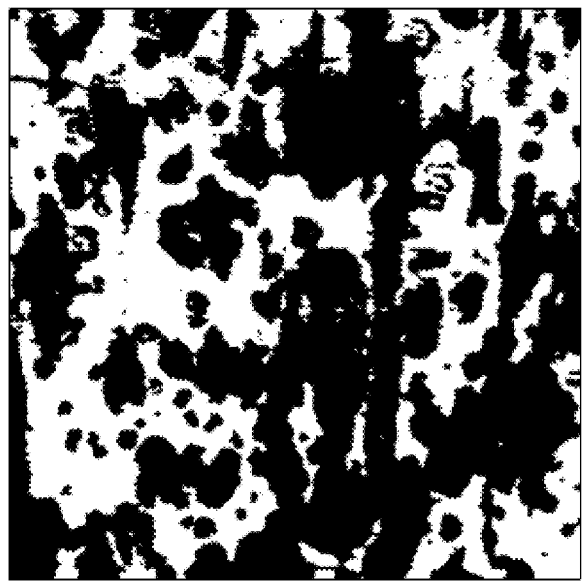
White: Electrolyte,
Black: Reinforcement Material

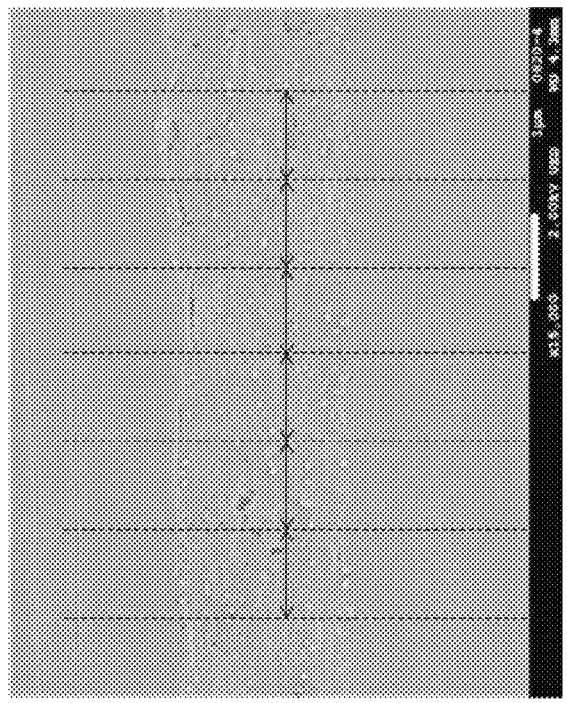
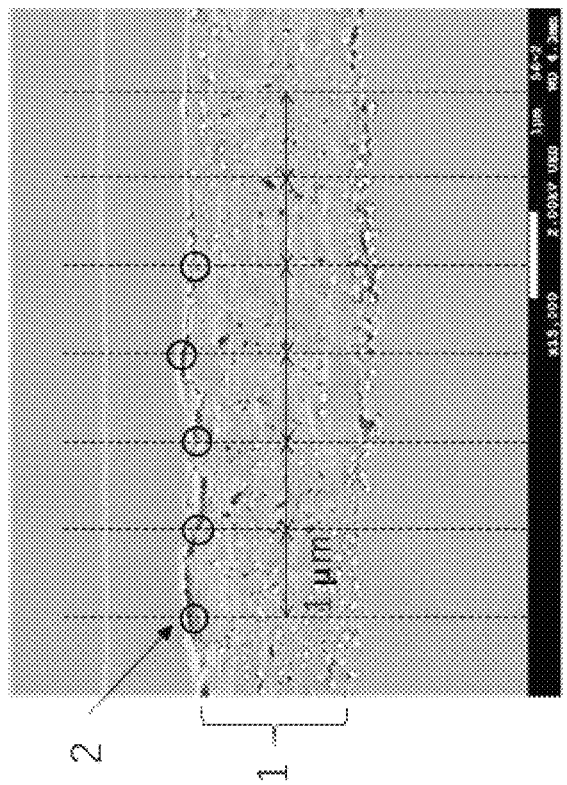
[Fig. 2]

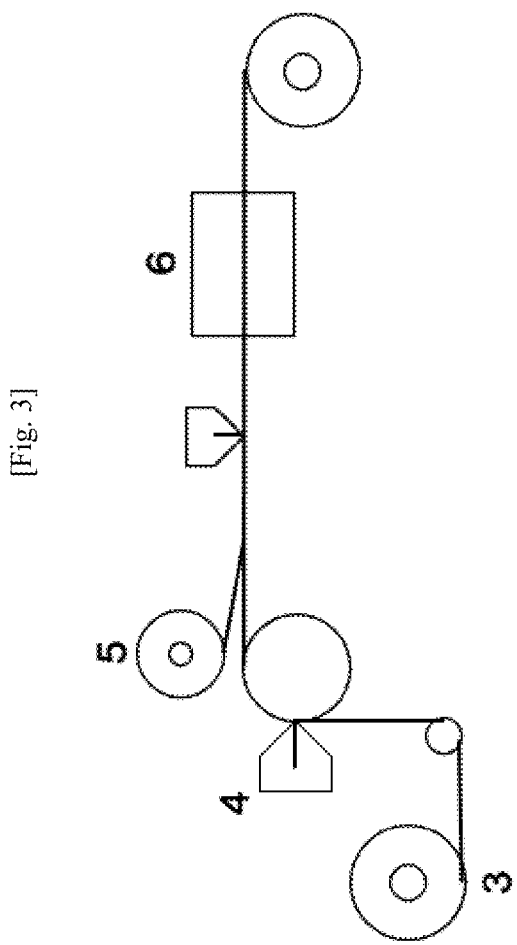
[Fig. 3]

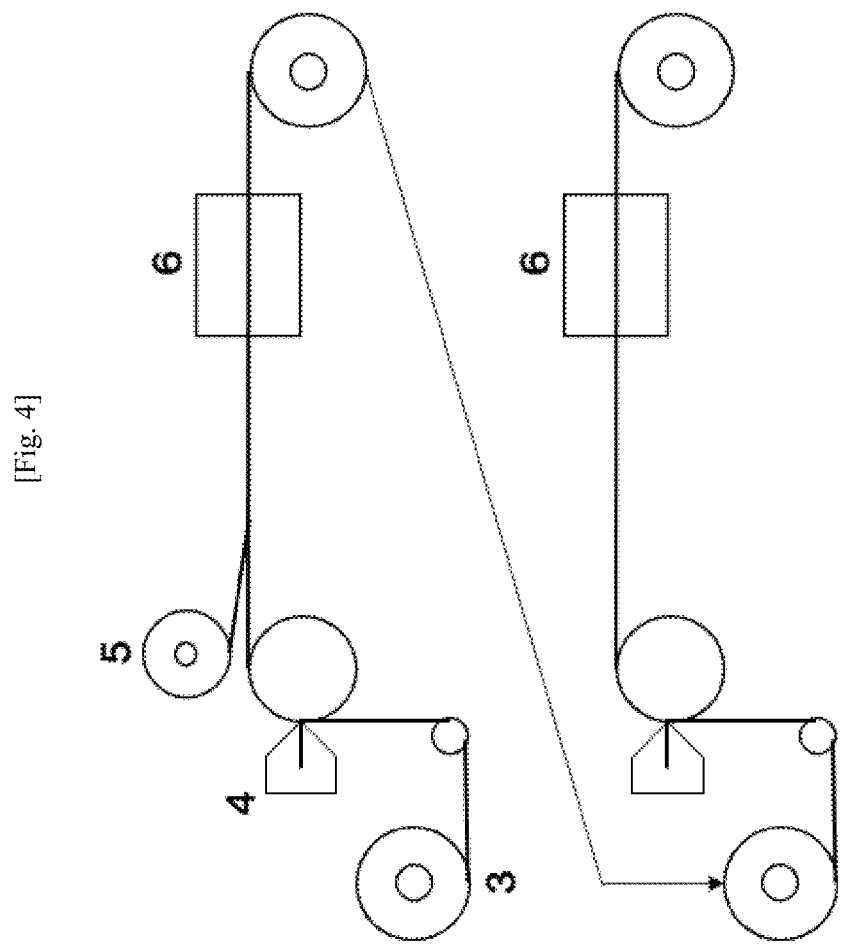
[Fig. 4]

COMPOSITE ELECTROLYTE MEMBRANE, ELECTROLYTE MEMBRANE HAVING CATALYST LAYER ATTACHED THERETO, MEMBRANE-ELECTRODE COMPOSITE, SOLID POLYMER-TYPE FUEL CELL, AND METHOD FOR PRODUCING COMPOSITE ELECTROLYTE MEMBRANE

TECHNICAL FIELD

The present invention relates to a composite electrolyte membrane having a composite layer that is a composite of a polymer electrolyte and a porous substrate, a catalyst coated electrolyte membrane, a membrane electrode assembly, a polymer electrolyte fuel cell, and a method of producing the composite electrolyte membrane.

BACKGROUND ART

Conventionally, a membrane made of "Nafion" (registered trademark) (manufactured by The Chemours Company), which is a perfluorosulfonic acid polymer, has been widely used as a polymer electrolyte membrane of a polymer electrolyte fuel cell or the like. However, a polymer electrolyte membrane made of "Nafion" (registered trademark) exhibits high proton conductivity under low humidification through a proton conduction channel formed by a cluster structure. Meanwhile, Nafion (registered trademark) has problems in that it is very expensive because of being produced through multi-step synthesis, and that the above-mentioned cluster structure causes significant fuel crossover. Moreover, problems such as disposal after use and the difficulty of material recycling have also been pointed out.

In order to overcome such problems, a hydrocarbon polymer electrolyte membrane that can be used in place of "Nafion" (registered trademark) been actively developed in recent years. However, a hydrocarbon polymer electrolyte membrane tends to undergo a large dimension change during a dry-wet cycle, and thus, is desired to undergo a decreased dimension change in order to have higher dry-wet cycle durability.

In view of this, an attempt is being made to make a polytetrafluoroethylene (PTFE) porous substrate and a hydrocarbon polymer electrolyte into a composite for the purpose of inhibiting the electrolyte membrane from undergoing a dimension change during a dry-wet cycle of the fuel cell. In general, a hydrocarbon polymer electrolyte is soluble in only an aprotic polar solvent, and an aprotic polar solvent has low affinity with a PTFE porous substrate. Accordingly, a PTFE porous substrate cannot be impregnated with a solution of a hydrocarbon polymer electrolyte dissolved in an aprotic polar solvent, thus making it difficult to produce a composite electrolyte membrane.

Patent Document 1 discloses a composite electrolyte membrane that is a composite of a polytetrafluoroethylene (PTFE)-made porous substrate and a hydrocarbon polymer electrolyte dissolved in a mixed solvent of N-methylpyrrolidone (NMP) and methanol. Patent Document 2 discloses a composite electrolyte membrane that is a composite of a hydrocarbon polymer electrolyte and a porous substrate composed of PTFE and impregnated with butanol. Patent Document 3 discloses a composite electrolyte membrane that is a composite of a hydrocarbon polymer electrolyte and a porous substrate composed of PTFE and hydrophilized by plasma treatment or the like.

PRIOR ART DOCUMENTS

Patent Documents

Patent Document 1: Japanese Patent Laid-open Publication No. 2010-232158
Patent Document 2: Japanese Patent Laid-open Publication No. 2017-114122
Patent Document 3: International Patent Application Publication No. WO2016/148017

SUMMARY OF THE INVENTION

Problems to be Solved by the Invention

However, the composite layer of a composite electrolyte membrane composed of a hydrocarbon polymer electrolyte and a PTFE porous substrate and produced conventionally has low affinity between the two materials, thus causing structural problems, for example, in that pores are generated in the composite layer, in that the polymer electrolyte ratio remains to be low, and in that the porous substrate fibers aggregate. Such a structural problem is accompanied by insufficient dry-wet cycle durability or power generation performance in cases where such a composite electrolyte membrane produced is used for an electrolyte membrane for a polymer electrolyte fuel cell.

The composite electrolyte membrane described in Patent Document 1 has insufficient affinity between the hydrocarbon polymer electrolyte and the PTFE porous substrate, and the resulting composite electrolyte membrane has pores, and thus, allows a large amount of fuel permeation, and in addition, has a problem also with the dry-wet cycle durability. Moreover, in a drying step after impregnating the PTFE porous substrate with the hydrocarbon polymer electrolyte solution, methanol precedes NMP in volatilization, and the affinity between the hydrocarbon polymer electrolyte solution used for the impregnation and the PTFE porous substrate decreases in the drying step. Such a decrease in turn causes a decrease in the ratio of the polymer electrolyte in the composite layer formed of the porous substrate and the polymer electrolyte, and causes the porous substrate fibers to be aggregated, thus posing a problem also with the power generation performance.

Making a study to produce a composite under the conditions described in Patent Document 2 resulted in finding that the Document does not make it possible to obtain a composite electrolyte membrane.

In the case of the composite electrolyte membrane described in Patent Document 3, hydrophilizing the PTFE porous substrate makes it possible to enhance the affinity with the hydrocarbon polymer electrolyte, and thus make a composite, but such hydrophilization treatment with plasma, metallic sodium, or the like causes nonuniformity in the degree of hydrophilization to occur between the surface layer and deep layer of the porous substrate. In addition, the very high reactivity makes it difficult to control the progress of the hydrophilization, and the hydrophilization treatment, if performed excessively, damages the porous substrate, and decreases the mechanical strength. Accordingly, the hydrophilization treatment, if performed to afford affinity sufficient to prevent aggregation of the PTFE porous substrate fibers during the formation of a composite, damages the porous substrate, and makes the mechanical strength of the composite electrolyte membrane insufficient. On the other hand, the hydrophilization treatment, if performed to the extent of causing no damage to the porous substrate, lowers the affinity between the hydrocarbon polymer electrolyte and the PTFE porous substrate, thus generating pores in the composite layer, decreasing the amount of the polymer electrolyte filled, and aggregating the porous substrate fibers.

An object of the present invention is to enable a composite electrolyte membrane composed of a hydrocarbon polymer electrolyte and a fluorine-containing polymer porous substrate to achieve high proton conduction ability and high dry-wet cycle durability.

Solutions to the Problems

To solve the above-mentioned problems, a composite electrolyte membrane according to the present invention has the following constitution. That is, a composite electrolyte membrane having a composite layer that is a composite of a hydrocarbon polymer electrolyte and a fluorine-containing polymer porous substrate, wherein a fractal dimension D exhibiting the distribution of the hydrocarbon polymer electrolyte and the fluorine-containing polymer porous substrate in the composite layer is 1.7 or more.

A catalyst coated membrane according to the present invention has the following constitution. That is, a catalyst coated membrane including the composite electrolyte membrane and a catalyst layer laminated on the composite electrolyte membrane.

A membrane electrode assembly according to the present invention has the following constitution. That is, a membrane electrode assembly including the composite electrolyte membrane.

A polymer electrolyte fuel cell according to the present invention has the following constitution. That is, a polymer electrolyte fuel cell including the composite electrolyte membrane.

A method of producing a composite electrolyte membrane according to the present invention has the following constitution. That is, a method of producing the composite electrolyte membrane, including:
step 1: impregnating a fluorine-containing polymer porous substrate with a solution containing a fluorinated surfactant or polyvinylidene fluoride, and removing the solvent; and
step 2: impregnating the fluorine-containing polymer porous substrate obtained in step 1 with a hydrocarbon polymer electrolyte solution, and removing the solvent.

The composite electrolyte membrane according to the present invention preferably has a wet tensile modulus of 20 N/cm or more.

In the composite electrolyte membrane according to the present invention, the oxygen atom content of the fluorine-containing polymer porous substrate is preferably 5 mass % or less.

In the composite electrolyte membrane according to the present invention, the fluorine atom content of the fluorine-containing polymer porous substrate is preferably 70 mass % or more.

In the composite electrolyte membrane according to the present invention, the hydrocarbon polymer electrolyte is preferably an ionic group-containing aromatic hydrocarbon polymer.

In the catalyst coated membrane according to the present invention, the ionic group-containing aromatic hydrocarbon polymer is preferably a block copolymer having at least one ionic group-containing segment (A1) and at least one ionic group-free segment (A2).

The composite electrolyte membrane according to the present invention preferably contains at least a fluorinated surfactant or polyvinylidene fluoride as an additive.

In the composite electrolyte membrane according to the present invention, the additive is preferably unevenly distributed in the composite layer.

Effects of the Invention

The present invention makes it possible to provide a composite electrolyte membrane having high proton conduction ability and high dry-wet cycle durability.

In addition, using a composite electrolyte membrane according to the present invention makes it possible to provide a polymer electrolyte fuel cell having excellent power generation characteristics and capable of long-term continuous operation.

BRIEF DESCRIPTION OF DRAWINGS

FIG. 1 is one example of a cross-sectional AFM image binarized.
FIG. 2 is a view illustrating one example of a method of determining whether there is any interfacial crack.
FIG. 3 is a schematic diagram of a roll membrane production apparatus used in Example 22.
FIG. 4 is a schematic diagram of a roll membrane production apparatus used in Comparative Example 4.

EMBODIMENTS OF THE INVENTION

In the following, the present invention will be described in detail. Hereinafter, the wording "to" in a numerical range represents that the range includes numerical values at both ends thereof

[Hydrocarbon Polymer Electrolyte]

The hydrocarbon polymer electrolyte is an electrolyte composed of an ionic group-containing hydrocarbon polymer. The hydrocarbon polymer is suitably an aromatic hydrocarbon polymer having an aromatic ring in the main chain. Herein, the aromatic ring may include not only a hydrocarbon aromatic ring but also a hetero ring. In addition, the hydrocarbon polymer may be partially formed from an aliphatic unit together with the aromatic ring unit.

Specific examples of the aromatic hydrocarbon polymer include polymers having, in the main chain, a structure selected from polysulfone, polyether sulfone, polyphenylene oxide, a polyarylene ether polymer, polyphenylene sulfide, polyphenylene sulfide sulfone, polyparaphenylene, a polyarylene polymer, polyarylene ketone, polyether ketone, polyarylene phosphine oxide, polyether phosphine oxide, polybenzoxazole, polybenzothiazole, polybenzimidazole, polyamide, polyimide, polyetherimide, and polyimidesulfone together with an aromatic ring. Note that "polysulfone", "polyether sulfone", "polyether ketone", and the like referred to herein are generic terms for structures having a sulfone bond, an ether bond, or a ketone bond in their molecular chains, and encompass polyether ketone ketone, polyether ether ketone, polyether ether ketone ketone, polyether ketone ether ketone ketone, and polyether ketone sulfone. The hydrocarbon skeleton may have a plurality of structures among the above-mentioned structures. Above all, a polymer having a polyether ketone skeleton, that is, a polyether ketone polymer is most preferable for the aromatic hydrocarbon polymer.

The hydrocarbon polymer electrolyte is suitably an electrolyte that forms a co-continuous or lamellar phase-separated structure. Such a phase-separated structure may be exhibited, for example, in a molded product containing a polymer blend of two or more incompatible polymers, such as an ionic group-containing hydrophilic polymer and an ionic group-free hydrophobic polymer, or a block copolymer including two or more incompatible segments, such as an ionic group-containing segment (A1) and an ionic group-free segment (A2). In a co-continuous or lamellar phase-separated structure, both hydrophilic and hydrophobic domains form a continuous phase, so that continuous proton conduction channels are formed, and a polymer electrolyte molded product excellent in proton conductivity can be obtained. Herein, the "domain" means a mass formed by aggregation of similar substances or segments in one molded product.

The ionic group-containing hydrocarbon polymer is preferably a block copolymer having at least one ionic group-containing segment (A1) and at least one ionic group-free segment (A2). Herein, the "segment" means a partial structure that is present in a polymer chain of a copolymer and includes repeating units exhibiting specific properties, and has a molecular weight of 2,000 or more. Use of a block copolymer makes it possible to exhibit a co-continuous phase-separated structure having finer domains than in the case of a polymer blend, and to achieve more excellent power generation performance and dry-wet cycle durability.

Hereinafter, the ionic group-containing aromatic hydrocarbon segment (A1) or polymer may be referred to as an "ionic block", and the ionic group-free aromatic hydrocarbon segment (A2) or polymer may be referred to as a "nonionic block". However, the phrase "ionic group-free" herein does not exclude an aspect in which the segment or polymer contains a small amount of ionic groups to the extent that the formation of the phase-separated structure is not inhibited.

In such a block copolymer, the molar composition ratio of the ionic block to the nonionic block (A1/A2) is preferably 0.20 or more, more preferably 0.33 or more, still more preferably 0.50 or more. Further, the molar composition ratio (A1/A2) is preferably 5.00 or less, more preferably 3.00 or less, still more preferably 2.50 or less. In cases where the molar composition ratio (A1/A2) is within the preferable range, the proton conductivity under low humidification conditions is not insufficient, and neither the hot water resistance nor the physical durability is insufficient. Herein, the molar composition ratio A1/A2 represents the ratio of the number of moles of repeating units present in the ionic block to the number of moles of repeating units present in the nonionic block. The "number of moles of repeating units" is a value obtained by dividing the number average molecular weight of the ionic block or the nonionic block by the molecular weight of the corresponding constituent unit.

The ionic group contained in the aromatic hydrocarbon polymer may be any ionic group having a proton exchange ability. Such a functional group is preferably a sulfonic acid group, a sulfonimide group, a sulfuric acid group, a phosphonic acid group, a phosphoric acid group, or a carboxylic acid group. The polymer may contain two or more types of ionic groups. Above all, it is more preferable that the polymer have at least one group selected from a sulfonic acid group, a sulfonimide group, and a sulfuric acid group from the viewpoint of high proton conductivity, and it is most preferable that the polymer have a sulfonic acid group from the viewpoint of raw material cost.

In the present invention, it is preferable to use an aromatic hydrocarbon block copolymer as the aromatic hydrocarbon polymer contained in the hydrocarbon polymer electrolyte, and the aromatic hydrocarbon polymer is more preferably a polyether ketone block copolymer. In particular, it is particularly preferable to use a polyether ketone block copolymer including a segment containing an ionic group-containing constituent unit (S1) and a segment containing an ionic group-free constituent unit (S2) shown below.

[Chemical Formula 1]

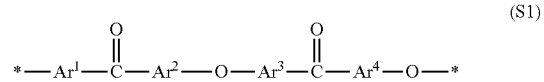

(S1)

(In the general formula (S1), $Ar^1$ to $Ar^4$ each represent any divalent arylene group, $Ar^1$ and/or $Ar^2$ contains an ionic group, and $Ar^3$ and $Ar^4$ may or may not contain an ionic group. $Ar^1$ to $Ar^4$ may be optionally substituted, and may each independently be two or more types of arylene groups. The symbol * represents a binding site to the constituent unit of the general formula (S1) or another constituent unit.)

[Chemical Formula 2]

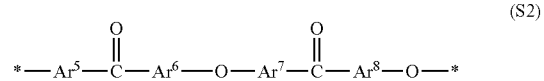

(S2)

(In the general formula (S2), $Ar^5$ to $Ar^8$ each represent any divalent arylene group and may be optionally substituted, but do not contain an ionic group. $Ar^5$ to $Ar^8$ may each independently be two or more types of arylene groups. The symbol * represents a binding site to the constituent unit of the general formula (S2) or another constituent unit.)

Herein, examples of the divalent arylene group preferable for $Ar^1$ to $Ar^8$ include hydrocarbon arylene groups such as a phenylene group, a naphthylene group, a biphenylene group, and a fluorenediyl group, and heteroarylene groups such as pyridinediyl, quinoxalinediyl, and thiophenediyl, but are not limited thereto. $Ar^1$ to $Ar^8$ are preferably phenylene groups and ionic group-containing phenylene groups, most preferably p-phenylene groups and ionic group-containing p-phenylene groups. Further, $Ar^5$ to $Ar^8$ may be substituted with a group other than an ionic group, but it is more preferable that $Ar^5$ to $Ar^8$ be unsubstituted groups in terms of proton conductivity, chemical stability, and dry-wet cycle durability.

[Fluorine-Containing Polymer Porous Substrate]

The fluorine-containing polymer porous substrate (hereinafter sometimes simply referred to as a "porous substrate") is a porous substrate formed by molding a fluorine atom-containing polymer. Since the fluorine atom-containing polymer is generally a hydrophobic compound, the fluorine atom-containing polymer may impart, by forming a composite with the hydrocarbon polymer electrolyte, water resistance to the composite electrolyte membrane to suppress dimension change of the electrolyte membrane upon water absorption. In addition, since a fluorine atom-containing polymer compound generally has low solubility in chemicals and is stable to chemical reactions, the compound can impart chemical resistance and chemical durability to the composite electrolyte membrane.

In the present invention, the oxygen atom content of the porous substrate is preferably 10 mass % or less, more preferably 8% or less, still more preferably 5% or less, as measured by X-ray photoelectron spectroscopy (XPS). The oxygen atom content in the preferable range makes it possible to prevent the water absorbability of the porous substrate from increasing and suppress the dimension change of the composite electrolyte membrane that has absorbed water. Specifically, the oxygen atom content of the porous substrate can be measured by the method described in item (13) in the section of EXAMPLES described later.

From the viewpoint of water resistance, the porous substrate preferably contains fluorine atoms in an amount of 50 mass % or more, more preferably contains fluorine atoms in an amount of 60 mass % or more, and particularly preferably contains fluorine atoms in an amount of 70 mass % or more. The fluorine atom content of the porous substrate is a value measured by burning the porous substrate to generate a gas, making a solution absorb the gas, and subjecting the solution having the gas absorbed therein to ion chromatography. Specifically, the fluorine atom content can be measured by the method described in item (8) in the section of EXAMPLES described later.

Incidentally, when the porous substrate present in the composite electrolyte membrane forming a composite with the polymer electrolyte is analyzed, it is possible to extract only the porous substrate by immersing the composite electrolyte membrane in a solvent that dissolves only the polymer electrolyte. The solvent to be used should be selected according to the chemical species and higher-order structure of the polymer electrolyte material. Examples of the suitably used solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, ester solvents such as γ-butyrolactone, ethyl acetate, and butyl acetate, carbonate solvents such as ethylene carbonate and propylene carbonate, and alkylene glycol monoalkyl ethers such as ethylene glycol monomethyl ether, ethylene glycol monoethyl ether, propylene glycol monomethyl ether, and propylene glycol monoethyl ether.

Examples of the fluorine atom-containing polymer contained in the porous substrate include polytetrafluoroethylene (PTFE), polyhexafluoropropylene, a tetrafluoroethylene-hexafluoropropylene copolymer (FEP), an ethylene-tetrafluoroethylene copolymer (ETFE), polyvinylidene difluoride (PVDF), polychlorotrifluoroethylene (PCTFE), a perfluoroalkoxy fluororesin (PFA), and an ethylene-chlorotrifluoroethylene copolymer (ECTFE), but are not particularly limited thereto. PTFE, polyhexapropylene, FEP, and PFA are preferable from the viewpoint of water resistance, and PTFE is particularly preferable because it has high mechanical strength due to molecular orientation.

Examples of the form of the porous substrate include: a stretched microporous film obtained by stretching a pore-free porous film in the film plane direction to form micropores; a wet-solidified microporous film obtained by preparing a solution of a fluorine atom-containing polymer compound, forming a film from the compound, and immersing the film in a poor solvent for the fluorine atom-containing polymer compound in a state where the film still contains the solvent to solidify the film; a nonwoven fabric made from a solution-spun fiber that is obtained by spinning a solution of a fluorine atom-containing polymer compound; and a nonwoven fabric made from a melt-spun fiber that is obtained by melt-spinning a fluorine atom-containing polymer compound. Examples of the solution spinning method include: a dry spinning method in which a fluorine atom-containing polymer solution is discharged from a spinneret into a fiber shape under high pressure, and the solution is dried with hot air; a wet spinning method in which a fluorine atom-containing polymer solution is discharged into a fiber shape, and the solution is immersed in a poor solvent for the fluorine atom-containing polymer compound to be solidified; and electrospinning in which a fluorine atom-containing polymer solution is discharged into a space to which a high voltage is applied, and the solution is pulled into a fiber shape by static electricity. Examples of the melt spinning method include melt-blown spinning in which a molten fluorine atom-containing polymer is discharged from a spinneret into a fiber shape.

The thickness of the porous substrate used in the present invention is not particularly limited, and is determined according to the use of the composite electrolyte membrane. A porous substrate having a film thickness of 0.5 to 50 μm is practically used, and a porous substrate having a film thickness of 2 μm or more and 40 μm or less is preferably used.

The porosity of the porous substrate before forming a composite with the hydrocarbon polymer electrolyte is not particularly limited. However, from the viewpoint of achieving both the proton conductivity and the mechanical strength of the composite electrolyte membrane obtained from the porous substrate, the porosity of the porous substrate is preferably 50 to 98%, more preferably 80 to 98%. The porosity Y1 (volume %) of the porous substrate is defined as a value calculated by the following mathematical formula.

$$Y1=(1-Db/Da)\times 100$$

Da: specific gravity of the polymer that constitutes the fluorine-containing polymer porous substrate Db: specific gravity of the entire fluorine-containing polymer porous substrate

[Fluorinated Surfactant]

The fluorinated surfactant used in the present invention (hereinafter sometimes simply referred to as a "surfactant") is preferably a compound having a fluorine-containing group including a fluorinated alkyl group, a fluorinated alkenyl group, or a fluorinated aryl group, which results from substitution of a hydrogen atom in an alkyl group, an alkenyl group, or an aryl group with a fluorine atom, and a lyophilic group (a hydrophilic group or a lipophilic group).

The lyophilic group is preferably a nonionic lyophilic group. The lyophilic group that is nonionic brings about low affinity with water, and thus, use of a fluorinated surfactant as an additive for the electrolyte membrane makes it less likely that the fluorinated surfactant is eluted from the electrolyte membrane, makes it less likely that the fluorine-containing polymer porous substrate and the hydrocarbon polymer electrolyte are delaminated at the interface therebetween, and makes it less likely that the mechanical durability is decreased.

The fluorine-containing group is preferably a perfluoroalkyl group, a perfluoroalkenyl group, or a perfluoroaryl group, which results from substitution of all the hydrogen atoms in an alkyl group, an alkenyl group, or an aryl group with fluorine atoms.

The fluorine-containing group is more preferably a fluorinated alkenyl group or a fluorinated aryl group because the group has an excellent surfactant effect, and is more preferably a fluorinated alkenyl group because the group has a flexible structure and exhibits a potent surfactant action.

The fluorine-containing group preferably has 2 or more carbon atoms, more preferably has 4 or more carbon atoms, particularly preferably has 6 or more carbon atoms. Meanwhile, the fluorine-containing group preferably has 20 or less carbon atoms, more preferably has 15 or less carbon atoms, particularly preferably has 10 or less carbon atoms. In cases where the carbon number is within the preferable range, such a surfactant has low volatility and water solubility, and is more likely to remain in the electrolyte membrane, thus making it less likely to decrease the dry-wet cycle durability.

Specific examples of the fluorinated alkyl group include a fluorinated ethyl group, a fluorinated propyl group, a fluorinated butyl group, a fluorinated pentyl group, a fluorinated hexyl group, a fluorinated heptyl group, a fluorinated octyl group, a fluorinated nonyl group, and a fluorinated decyl group. Further, specific examples of the fluorinated alkenyl group include a fluorinated ethenyl group, a fluorinated propenyl group, a fluorinated butenyl group, a fluorinated pentenyl group, a fluorinated hexenyl group, a fluorinated heptenyl group, a fluorinated octenyl group, a fluorinated nonenyl group, and a fluorinated decenyl group. Above all, a fluorinated hexyl group, a fluorinated heptyl group, a fluorinated octyl group, a fluorinated nonyl group, a fluorinated decyl group, a fluorinated hexenyl group, a fluorinated heptenyl group, a fluorinated octenyl group, a fluorinated nonenyl group, and a fluorinated decenyl group are more preferable because they have low volatility and low water solubility and tend to remain in the electrolyte membrane. Herein, the "fluorinated ethyl group" encompasses five types of functional groups including a monofluoroethyl group, a difluoroethyl group, a trifluoroethyl group, a tetrafluoroethyl group, and a pentafluoroethyl group depending on the number of fluorine atoms included in one functional group, and the term "fluorinated ethyl group" herein is used as a generic term for those groups. The same applies to other functional groups such as the "fluorinated propyl group" and the "fluorinated butyl group". Further, the "difluoroethyl group" is a functional group having two fluorine atoms, and there are three types of structural isomers including a 1,1-difluoroethyl group, a 1,2-difluoroethyl group, and a 2,2-difluoroethyl group. The term "difluoroethyl group" herein is used as a generic term for those groups. The same applies to other functional groups such as the "trifluoroethyl group" and the "tetrafluoroethyl group".

The fluorine-containing group may have a linear, branched, or cyclic structure. The branched structure is preferable because the structure may weaken the interaction between the fluorine compound molecules and may easily lower the surface tension of the surfactant. In the present invention, a surfactant having a fluorine-containing group including a structure represented by the following formula (F1) is particularly preferable.

[Chemical Formula 3]

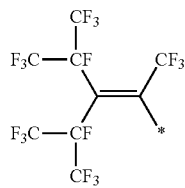

(F1)

(In the formula (F1), the symbol * means a binding site with another atomic group.)

The fluorinated surfactant is suitably a compound containing 10 mass % or more of fluorine atoms in one molecule. The nonionic fluorinated surfactant is more preferably a compound containing 20 mass % or more of fluorine atoms, still more preferably a compound containing 40 mass % or more of fluorine atoms. In cases where the amount of fluorine atoms contained in one molecule is within the preferable range, the effect of enhancing the affinity between the hydrocarbon polymer electrolyte and the fluorine-containing polymer porous substrate is sufficient, and the hydrocarbon polymer electrolyte can be contained sufficiently in the composite layer, thus making it less likely to cause a problem such as aggregation of the fluorine-containing polymer porous substrate fibers.

The lyophilic group can be a hydrophilic group or a lipophilic group. The hydrophilic group is a functional group having a hydrophilic element selected from the group consisting of oxygen, nitrogen, phosphorus, sulfur, and boron. The hydrophilic group is preferably a group including a polyether group, a carboxylic acid ester group, a sulfonic acid ester group, a phosphorus acid ester group, or a phosphoric acid ester group, and is more preferably a group including a polyether group because the polyether group is excellent in the affinity with the polymer electrolyte due to a hydrogen bond formed between the polyether group and the ionic group, and is also excellent in chemical stability. Above all, it is preferable that the hydrophilic group be a group having a polyalkyl ether structure represented by the following general formula (C1) or a polyacrylate structure represented by the general formula (C2), and it is more preferable that the hydrophilic group be a polyalkyl ether represented by the general formula (C1) because the group is excellent in the affinity with the polymer electrolyte.

[Chemical Formula 4]

(C1)

(C2)

(In the general formula (C1), q and r are natural numbers that satisfy $r=2q$, and s is an integer of 1 or more and 1,000 or less and means a repeating number of alkyl ether structures. In the general formula (C2), R is at least one group selected from a hydrogen atom, an alkyl group having 1 to 20 carbon atoms, an alkenyl group having 1 to 20 carbon atoms, and an aryl group having 6 to 20 carbon atoms, and t is an integer of 1 or more and 1,000 or less and means a repeating number of acrylate structures. In the general formula (C1) or (C2), when s or t is 2 or more, the plurality of alkyl ether structures or acrylate structures may be identical or different.)

Examples of the lipophilic group include an alkyl group, an alkenyl group, an alkynyl group, and a phenyl group that do not include a fluorine atom.

The fluorinated surfactant is preferably a compound having a vapor pressure at 150° C. of less than 2 kPa, particularly preferably a compound having a vapor pressure at 150° C. of 1 kPa or less, and most preferably a compound having no boiling point, that is, a compound that starts thermal decomposition without boiling. In the present invention, it is particularly preferable that the fluorinated surfactant be a compound having a 5% weight loss temperature of 150° C. or more in thermogravimetry-differential thermal analysis.

Such a fluorinated surfactant can remain in the composite electrolyte membrane, and provide excellent physical durability since the fluorinated surfactant does not volatilize or decompose during film formation.

The fluorinated surfactant preferably has a weight average molecular weight of 1,000 or more, more preferably 1,500 or more, still more preferably 2,000 or more. In cases where the weight average molecular weight of the fluorinated surfactant is less than 1,000, such a fluorinated surfactant is volatilized in the drying step during film formation, and dissolved in the electrolyte membrane solution, and thus, can decrease the affinity between the hydrocarbon polymer electrolyte and the fluorine-containing polymer porous substrate, decrease the ratio of the hydrocarbon polymer electrolyte in the composite layer, and cause the fluorine-containing polymer porous substrate fibers to be aggregated.

In the fluorinated surfactant, the fluorine-containing group preferably has a molecular weight of 200 or more, more preferably 400 or more, still more preferably 1,000 or more. In cases where the molecular weight of the fluorine-containing group is within the preferable range, the fluorine-containing group has the molecular chain having sufficient flexibility and degree of freedom, provides sufficient affinity between the hydrocarbon polymer electrolyte and the fluorine-containing polymer porous substrate, prevents a decrease in the ratio of the hydrocarbon polymer electrolyte in the composite layer, and does not cause the fluorine-containing polymer porous substrate fibers to be aggregated.

Examples of the nonionic fluorinated surfactant to be preferably used in the present invention include "MEGAFACE" (registered trademark) F-251, F-253, F-281, F-430, F-477, F-551, F-552, F-553, F-554, F-555, F-556, F-557, F-558, F-559, F-560, F-561, F-562, F-563, F-565, F-568, F-570, F-572, F-574, F-575, F-576, R-40, R-40-LM, R-41, R-94, RS-56, RS-72-K, RS-75, RS-76-E, RS-76-NS, DS-21, F444, and TF-2066 manufactured by DIC Corporation, "Surflon" (registered trademark) S-141, S-145, S-241, S-242, S-243, S-386, S-420, S-611, and S-651 manufactured by AGC Inc., "Ftergent" (registered trademark) 251, 208M, 212M, 215M, 250, 209F, 222F, 245F, 208G, 218GL, 240G, 212P, 220P, 228P, FTX-218, DFX-18, 710FL, 710FM, 710FS, 730FL, 730FM, 610FM, 683, 601AD, 601ADH2, 602A, 650AC, and 681 manufactured by NEOS Company Limited, EF-PP31N04, EF-PP31N09, EF-PP31N15, and EF-PP31N22 manufactured by Mitsubishi Materials Electronic Chemicals Co., Ltd., FC-4430 and FC-4432 manufactured by 3M Company, PF-151N, PF-636, PF-6320, PF-656, PF-6520, PF-652-NF, and PF-3320 manufactured by OMNOVA Solutions Inc., TG-9131 and "ZEFFLE" (registered trademark) GH-701 manufactured by Daikin Industries, Ltd., and "Fluorolink" (registered trademark) A10-P manufactured by Solvay Japan, Ltd.

In addition, polyvinylidene fluoride can be used as a fluorinated surfactant, and carries out the function of enhancing the affinity between the hydrocarbon polymer electrolyte and the fluorine-containing polymer porous substrate.

[Polyvinylidene Fluoride]
Polyvinylidene fluoride encompasses a vinylidene fluoride homopolymer (that is, pure polyvinylidene fluoride) and besides, a copolymer of vinylidene fluoride and another copolymerizable monomer. Examples of monomers copolymerizable with vinylidene fluoride include tetrafluoroethylene, hexafluoropropylene, trifluoroethylene, trichloroethylene, vinyl fluoride, and the like, and one or two or more thereof can be used. Such a polyvinylidene fluoride resin can be obtained by emulsion polymerization or suspension polymerization.

Polyvinylidene fluoride used in the present invention and having a large molecular weight makes it possible to enhance adhesion between the hydrocarbon polymer electrolyte and the fluorine-containing polymer porous substrate. Accordingly, the polyvinylidene fluoride preferably has a weight average molecular weight of 300,000 or more, more preferably 500,000 or more.

Here, polyvinylidene fluoride is one kind of fluorinated surfactant.

[Composite Electrolyte Membrane]
A composite electrolyte membrane according to the present invention has a composite layer that is a composite of the above-mentioned hydrocarbon polymer electrolyte and the above-mentioned fluorine-containing polymer porous substrate, wherein a fractal dimension D exhibiting the distribution of the hydrocarbon polymer electrolyte and the fluorine-containing polymer porous substrate in the composite layer is 1.7 or more, as determined by cross-sectional atomic force microscope (AFM) observation of the composite layer. The fractal dimension D of less than 1.7 represents a low polymer ratio of the reinforcement layer or aggregation of the fluorine-containing porous substrate fibers, posing a problem in that the dry-wet cycle durability, proton conductivity, and power generation performance are decreased. The fractal dimension D is more preferably 1.75 or more, particularly preferably 1.8 or more. The fractal dimension D is a value that comes closer to 2.0 as the ratio of the hydrocarbon polymer electrolyte in the composite layer increases, or as the dispersibility of the fluorine-containing polymer porous substrate fibers increases, and contrarily, a value that comes closer to 0 as the ratio of the hydrocarbon polymer electrolyte decreases, or as the fluorine-containing polymer porous substrate is aggregated. The cross-sectional AFM observation and the fractal dimension calculation method in detail are to be performed by the methods described in (14) and (15) in EXAMPLES.

The filling rate of the hydrocarbon polymer electrolyte in the composite layer is preferably 50% or more, more preferably 60% or more. If the filling rate in the composite layer is within the preferable range, the proton conduction path is less likely to be lost, making it less likely to decrease the power generation performance. The filling rate in the composite layer in the present invention is a value indicating the percentage of the polymer electrolyte in the total volume of the composite layer. Specifically, the filling rate is to be measured by the method described in (3) in the section of EXAMPLES.

A composite electrolyte membrane according to the present invention may be composed of one such composite layer, or may be a laminate composed of two or more such composite layers. Such a laminate may be composed of a plurality of different composite layers having different filling rates. In addition, the composite electrolyte membrane may have a polymer electrolyte layer in contact with either side or one side of the composite layer, wherein the polymer electrolyte layer is composed of only a hydrocarbon polymer electrolyte and does not form a composite with a reinforcement material such as a porous substrate. When the composite electrolyte membrane has such a layer, it is possible to improve the adhesion between the composite electrolyte membrane and the electrode, and to suppress interface delamination.

Allowing a composite electrolyte membrane according to the present invention to have the composite layer makes it possible to reduce the dimension change rate in the plane direction. A smaller dimension change rate of the composite electrolyte membrane in the plane direction thereof, in use of the composite electrolyte membrane as an electrolyte membrane of a fuel cell, can reduce the stress due to swelling and shrinkage of the electrolyte membrane at the edge portion during a dry-wet cycle, and improve the durability. The dimension change rate $\lambda_{xy}$ of the composite electrolyte membrane in the plane direction thereof is preferably 10% or less, more preferably 8% or less, still more preferably 5% or less.

Further, the dimension change rate of the composite electrolyte membrane in the plane direction thereof is preferably small in MD and TD anisotropy. If the composite electrolyte membrane has small anisotropy, the cell design of the fuel cell may be less restricted, the stress due to swelling and shrinkage of the membrane is less likely to concentrate on the edge orthogonal to the direction in which the dimension change is large, and the edge is less likely to generate the starting point of breakage of the electrolyte membrane. Specifically, it is preferable that the ratio of the dimension change rate in the MD ($\lambda$MD) to the dimension change rate in the TD (LTD), that is, $\lambda_{MD}/\lambda_{TD}$, in the plane direction of the composite electrolyte membrane satisfy $0.5<\lambda_{MD}/\lambda_{TD}<2.0$. Herein, the dimension change rate is an index representing the change between the dimension of the composite electrolyte membrane in a dry state and the dimension of the composite electrolyte membrane in a wet state. Specifically, the dimension change rate is measured by the method described in item (4) in the section of EXAMPLES.

A composite electrolyte membrane according to the present invention preferably has a wet tensile modulus of 20 N/cm or more per width, more preferably 30 N/cm or more, still more preferably 40 N/cm or more. Having a wet tensile modulus of 20 N/cm or more per width makes it possible to suppress the softening of the electrolyte membrane in a wet state, and further enhance the physical durability of the fuel cell. Specifically, the wet tensile modulus is measured by the method described in item (17) in the section of EXAMPLES.

The thickness of the composite layer in the composite electrolyte membrane according to the present invention is not particularly limited, but is preferably 0.5 μm or more and 50 μm or less, more preferably 2 μm or more and 40 μm or less. The composite layer within the preferable range makes it possible to maintain the mechanical durability of the electrolyte membrane, and at the same time, prevent the membrane resistance from increasing, and on the other hand, leads to enhancing the power generation performance, providing excellent mechanical durability, and making it less likely to cause problems such as electrical short circuit and fuel permeation.

The composite electrolyte membrane preferably has a content of the fluorinated surfactant, in terms of the mass ratio to the total amount of the hydrocarbon polymer electrolyte contained in the composite electrolyte membrane, of 0.005 or more, more preferably 0.01 or more. Meanwhile, the content of the fluorinated surfactant is preferably 0.20 or less, more preferably 0.10 or less. The ratio within the preferable range provides sufficient affinity between the hydrocarbon polymer electrolyte and the fluorine-containing polymer porous substrate, makes it less likely to decrease the ratio of the hydrocarbon polymer electrolyte in the composite layer, makes it less likely to cause the fluorine-containing polymer porous substrate fibers to be aggregated, and on the other hand, does not cause the surfactant to be excessive, and makes it less likely to decrease the proton conductivity of the electrolyte membrane. It is to be noted that the content of the surfactant herein is the amount of the surfactant remaining in the completed electrolyte membrane, and excludes the amount of the surfactant lost during the production process.

The fluorinated surfactant in the composite electrolyte membrane is preferably unevenly distributed in the electrolyte of the composite layer. Being unevenly distributed specifically means that the value of "(the fluorinated surfactant mass contained in the composite layer/the electrolyte ratio)/the film thickness of the composite layer" is 1.2 or more, more preferably 2.0 or more, with respect to "the fluorinated surfactant mass contained in the monolayer/the film thickness of the monolayer". In a preferable form of usage of the fluorinated surfactant, the fluorine-containing polymer porous substrate is coated with the fluorinated surfactant, and then impregnated with a hydrocarbon polymer electrolyte solution so as to form a composite of the hydrocarbon polymer electrolyte and the fluorine-containing polymer porous substrate. In the impregnating and drying step, the fluorinated surfactant coating may be partially dissolved in the hydrocarbon polymer electrolyte solution, and migrate into the monolayer. The dissolution amount that is not too large but is suitable provides sufficient affinity between the hydrocarbon polymer electrolyte and the fluorine-containing polymer porous substrate, does not decrease the ratio of the hydrocarbon polymer electrolyte in the composite layer, and makes it less likely to cause the fluorine-containing polymer porous substrate fibers to be aggregated. That is, even if the ratio of the hydrocarbon polymer electrolyte is high in the composite layer, and even if the dispersibility of the fluorine-containing polymer porous substrate fibers is high in the reinforcement membrane, the fluorinated surfactant is less likely to be unevenly distributed in the composite layer. In cases where the fluorinated surfactant is added to the electrolyte solution, it is preferable to devise a drying method and the like so that the fluorinated surfactant can be unevenly distributed in the composite layer.

[Method for Producing Composite Electrolyte Membrane]

In a first aspect of the present invention, the composite electrolyte membrane can be produced by impregnating the fluorine-containing polymer porous substrate with a hydrocarbon polymer electrolyte solution and then drying the solution to remove the solvent contained in the hydrocarbon polymer electrolyte solution. In this case, the first aspect that includes a method of impregnating the porous substrate with the hydrocarbon polymer electrolyte solution mixed with the fluorinated surfactant in advance, and the details of the hydrocarbon polymer electrolyte, fluorine-containing polymer porous substrate, and fluorinated surfactant that are to be used in a production method in the below-mentioned second aspect are as above-mentioned, and thus, omitted here.

The content of the fluorinated surfactant in the hydrocarbon polymer electrolyte solution is preferably 0.005 or more, more preferably 0.01 or more in terms of the mass ratio to the total amount of the hydrocarbon polymer electrolyte. Meanwhile, the content of the surfactant is preferably 0.20 or less, more preferably 0.10 or less. The ratio within the preferable range provides sufficient affinity between the hydrocarbon polymer electrolyte solution and the fluorine-containing polymer porous substrate, does not decrease the ratio of the hydrocarbon polymer electrolyte in the composite layer, makes it less likely to cause the fluorine-containing polymer porous substrate fibers to be aggregated, and on the other hand, does not cause the surfactant to be excessive, and makes it less likely to decrease the proton conductivity of the electrolyte membrane.

Further, in a second aspect to be more preferably applied in the present invention, the composite electrolyte membrane can be produced by impregnating the fluorine-containing polymer porous substrate, to which the fluorinated surfactant is previously applied, with a hydrocarbon polymer electrolyte solution, and then drying the solution to remove the solvent contained in the impregnating solution.

In this case, examples of the method for applying the fluorinated surfactant to the fluorine-containing polymer porous substrate include:

(1) a method of pulling up the fluorine-containing polymer porous substrate immersed in a fluorinated surfactant solution and removing the excess solution to control the amount of the applied solution;

(2) a method of applying a fluorinated surfactant solution to the fluorine-containing polymer porous substrate by cast coating; and (3) a method of bonding the fluorine-containing polymer porous substrate onto a support substrate to which a fluorinated surfactant solution is applied by cast coating to impregnate the fluorine-containing polymer porous substrate with the surfactant solution.

The hydrocarbon polymer electrolyte solution to be used in the second aspect may also be mixed with the fluorinated surfactant in advance.

When the fluorinated surfactant is liquid or oily, the fluorinated surfactant itself may be impregnated into the porous substrate in place of the fluorinated surfactant solution. However, it is preferable to use the fluorinated surfactant solution containing the fluorinated surfactant dissolved in a predetermined solvent for the purpose of adjusting the viscosity so that the surfactant may easily penetrate into the fluorine-containing polymer porous substrate, or diluting the surfactant solution so that an excessive amount of the surfactant may not be applied to the porous substrate.

As for a method for applying the fluorinated surfactant solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied.

In the second aspect, the fluorinated surfactant is preferably applied in an amount of 1 mass % or more, more preferably 3 mass % or more based on 100 mass % of the fluorine-containing polymer porous substrate. Similarly, the surfactant is preferably applied in an amount of 30 mass % or less, more preferably 20 mass % or less. If the amount of the fluorinated surfactant applied is within the preferable range, the affinity between the polymer electrolyte and the porous substrate does not decrease, and it is easy to form a composite. On the other hand, such an amount does not cause the surfactant to be excessive, prevents the pores of the fluorine-containing polymer porous substrate from being blocked, and makes it less likely to decrease the proton conductivity of the composite electrolyte membrane.

In the second aspect, it is preferable that addition of the fluorinated surfactant make it possible to impregnate the fluorine-containing polymer porous substrate with the hydrocarbon polymer electrolyte solution. When droplets of the hydrocarbon polymer electrolyte solution become transparent within 120 seconds after being disposed on the surface of the fluorine-containing polymer porous substrate, such a result represents an index of good impregnation. In addition, a preferable index of affinity between the fluorine-containing polymer porous substrate and the hydrocarbon polymer electrolyte is that an aprotic polar solvent to be used as a solvent for the hydrocarbon polymer electrolyte solution is ready for impregnation. In particular, droplets of N-methyl-2-pyrrolidone, which is a typical aprotic polar solvent, preferably become transparent within 30 seconds, more preferably become transparent within 10 seconds, after being disposed on the surface of the fluorine-containing polymer porous substrate.

Further, in the second aspect, it is preferable to use, as the fluorinated surfactant, a compound insoluble in the solvent of the hydrocarbon polymer electrolyte solution with which the porous substrate is impregnated. Use of such a fluorinated surfactant prevents the diffusion of the surfactant into the polymer electrolyte from the fluorine-containing polymer porous substrate upon impregnation of the porous substrate with the hydrocarbon polymer electrolyte solution, and makes it possible to prevent the reduction of proton conductivity due to the presence of the surfactant while sufficiently exhibiting the function of the surfactant.

In the first and second aspects, the concentration of the hydrocarbon polymer electrolyte solution is preferably 3 to 40 mass %, more preferably 5 to 25 mass %. When the concentration is within this range, the hydrocarbon polymer electrolyte can be sufficiently filled in the pores of the porous substrate, and a composite layer excellent in surface smoothness can be easily obtained. If the concentration of the hydrocarbon polymer electrolyte is within the preferable range, the efficiency at which the pores of the porous substrate are filled with the hydrocarbon polymer electrolyte does not decrease, and the impregnation treatment does not need to be performed a plurality of times, and on the other hand, the viscosity of the solution is not too high, and thus, the pores of the porous substrate can be filled with the polymer electrolyte sufficiently.

The viscosity of the hydrocarbon polymer electrolyte solution is preferably 100 to 50,000 mPa·s, more preferably 300 to 10,000 mPa·s. If the viscosity is less than 100 mPa·s, the film thickness of the composite electrolyte membrane may become uneven. If the viscosity is within the preferable range, the pores of the fluorine-containing polymer porous substrate can be filled with the hydrocarbon polymer electrolyte sufficiently, and the composite electrolyte membrane has good surface smoothness.

The solvent used in the hydrocarbon polymer electrolyte solution can be appropriately selected according to the polymer species. Examples of solvents to be suitably used include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide. Examples of solvents to be mixed with these include carbonate solvents such as ethylene carbonate and propylene carbonate, alkylene glycol monoalkyl ethers such as ethylene glycol monomethyl ether, ethylene glycol monoethyl ether, propylene glycol monomethyl ether, and propylene glycol monoethyl ether, alcohol solvents such as methanol, ethanol, 1-propanol, and isopropyl alcohol, ketone solvents such as acetone, methyl ethyl ketone, and methyl isobutyl ketone, ester solvents such as y-butyrolactone, ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, and dichlorobenzene, ether solvents such as diethyl ether, tetrahydrofuran, and 1,4-dioxane, nitrile solvents such as acetonitrile, nitrated hydrocarbon solvents such as nitromethane and nitroethane, and water. The solvent may be used singly, or a mixed solvent that is a mixture of two or more types of these solvents may also be used.

Examples of the method for impregnating the fluorine-containing polymer porous substrate with the hydrocarbon polymer electrolyte solution include the following:

(1) a method of pulling up the fluorine-containing polymer porous substrate immersed in the hydrocarbon polymer electrolyte solution and removing the excess solution to control the film thickness;

(2) a method of applying the hydrocarbon polymer electrolyte solution to the fluorine-containing polymer porous substrate by cast coating; and (3) a method of bonding the fluorine-containing polymer porous substrate onto a support substrate to which the hydrocarbon polymer electrolyte solution is applied by cast coating to impregnate the fluorine-containing polymer porous substrate with the solution.

When the substrate is impregnated with the solution in accordance with the method (3), the solvent can be dried as it is. In addition, when the impregnating process is performed in accordance with the method (1) or (2), a method of drying the solvent of the polymer electrolyte solution in a state where the porous substrate is bonded to a separately prepared support substrate is preferable from the viewpoint of reducing the wrinkles and thickness unevenness of the electrolyte membrane and improving the membrane quality.

As for a method for applying the hydrocarbon polymer electrolyte solution by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied. Herein, an apparatus used for applying the hydrocarbon polymer electrolyte solution by cast coating is called a coater.

After the hydrocarbon polymer electrolyte solution is applied to the substrate, the polymer electrolyte solution is subjected to a drying step to form a composite electrolyte membrane. In the drying step, the coating film of the hydrocarbon polymer electrolyte solution with which the fluorine-containing polymer porous substrate is impregnated is heated to evaporate the solvent. The heating means is not particularly limited as long as the means can evaporate the solvent. For example, a heating device such as an oven and a heater, a device for controlling the temperature in the vicinity of the composite electrolyte membrane with infrared rays, warm air, or the like can be used. Further, heat may be conducted to the coating film via the substrate. As for the heating temperature range, the temperature is preferably close to the boiling point of the solvent and equal to or lower than the glass transition temperature of the electrolyte membrane. It is also possible to remove the solvent only by reducing the pressure or introducing an air flow without heating the coating film.

Examples of the drying procedure include:

(1) a method of bonding the fluorine-containing polymer porous substrate onto a substrate to which the hydrocarbon polymer electrolyte solution is applied, drying the solution, applying the hydrocarbon electrolyte solution to the surface of the dried film, and drying the solution to produce a composite electrolyte membrane.

(2) a method of bonding the fluorine-containing polymer porous substrate onto a substrate to which the hydrocarbon polymer electrolyte solution is applied, applying the hydrocarbon electrolyte solution to the surface of the wet film, and drying the solution to produce a composite electrolyte membrane.

In particular, in a roll to roll process, the method (2) is preferable from the viewpoint of making it possible to increase the filling amount of the polymer in the reinforcement layer, and reducing the number of processes by one.

The drying time and the drying temperature in the drying step can be appropriately determined experimentally, but it is preferable to dry the solution at least to such an extent that a self-supporting membrane is obtained after the membrane is separated from the substrate. The drying method may be selected from known methods such as heating of the substrate, hot air, and an infrared heater. The drying temperature is preferably 200° C. or less, more preferably 150° C. or less in consideration of decomposition of the polymer electrolyte and the surfactant.

The hydrocarbon polymer electrolyte in the solution may be an electrolyte in which the ionic group forms a salt with a cation of an alkali metal or an alkaline earth metal. In this case, the method preferably includes, after the step of forming a membrane on the substrate and subjecting the membrane to the drying step, a step of exchanging the cation of an alkali metal or an alkaline earth metal with a proton. This step is more preferably a step of bringing the formed membrane into contact with an acidic aqueous solution. Further, it is still more preferable that the membrane be brought into contact with the acidic aqueous solution by a step of immersing the formed membrane in the acidic aqueous solution. In this step, the proton in the acidic aqueous solution is substituted with the cation that is ionically bonded to the ionic group, and residual water-soluble impurities, residual monomers, solvents, residual salts, and the like are simultaneously removed. The acidic aqueous solution is not particularly limited, and sulfuric acid, hydrochloric acid, nitric acid, acetic acid, trifluoromethanesulfonic acid, methanesulfonic acid, phosphoric acid, citric acid, or the like is preferably used. The temperature and concentration of the acidic aqueous solution are appropriately determined. From the viewpoint of productivity, it is preferable to use an aqueous sulfuric acid solution of 3 mass % or more and 30 mass % or less at a temperature of 0° C. or more and 80° C. or less.

[Method for Producing Catalyst Coated Membrane]

The catalyst coated membrane (hereinafter referred to as CCM) is produced by forming a catalyst layer on either side of the electrolyte membrane thus obtained. The method for forming the catalyst layer is not particularly limited. However, a method of applying a catalyst layer ink and drying the catalyst layer ink, and a method of transferring, using a catalyst layer decal including a catalyst layer formed in advance on a decal substrate, the catalyst layer and then drying the catalyst layer are preferable since the methods have simple steps and can reduce the process cost.

In the case of the method of applying the catalyst layer ink, the application method is not particularly limited as long as the catalyst layer ink can be applied in a desired shape, and the methods described in the above-mentioned step of applying the mixed solution can be used.

The solvent contained in the catalyst layer ink is not particularly limited as long as it is a solvent in which the ionic group-containing polymer electrolyte and the catalyst-supporting carbon particles can be dispersed, but a solvent that is easy to evaporate and remove by heating is preferable. For example, a solvent having a boiling point of 140° C. or less is preferable. Specific examples of the solvent of the catalyst layer ink include one solvent or a mixture of two or more solvents among water, alcohols such as methanol, ethanol, 1-propanol, 2-propanol, 1-butanol, 2-butanol, isobutyl alcohol, tert-butyl alcohol, and pentanol, ketones such as acetone, methyl ethyl ketone, pentanone, hexanone, heptanone, cyclohexanone, methylcyclohexanone, acetonylacetone, and diisobutyl ketone, ethers such as tetrahydrofuran, dioxane, diethylene glycol dimethyl ether, anisole, methoxytoluene, and dibutyl ether, esters such as methyl acetate, ethyl acetate, normal propyl acetate, isopropyl acetate, butyl acetate, methyl lactate, ethyl lactate, and butyl lactate, and dimethylformamide, dimethylacetamide, N-methylpyrrolidone, ethylene glycol, diethylene glycol, diacetone alcohol, and 1-methoxy-2-propanol.

In the case of the method of transferring the catalyst layer using the catalyst layer decal, first, the catalyst layer ink is applied to the substrate, and the catalyst layer is subjected to a drying step as necessary to produce the catalyst layer decal. Then, the electrolyte membrane is sandwiched between the catalyst layer decal on the cathode electrode side and the catalyst layer decal on the anode electrode side, and the resulting laminate is hot-pressed so that the surfaces of the decals on which each catalyst layer is provided may come into contact with the solid polymer electrolyte membrane to produce a catalyst coated membrane. The temperature and pressure in the hot pressing may be appropriately selected according to the thickness and water content of the electrolyte membrane, the catalyst layer, and the decal substrate. From the viewpoint of industrial productivity and suppression of thermal decomposition of the ionic group-containing polymer material, the temperature is preferably within the range of 0° C. to 250° C., and is more preferably higher than the glass transition temperature of the polymer electrolyte contained in the catalyst layer and 200° C. or less. The pressure applied in the hot pressing is preferably as low as possible from the viewpoint of protecting the polymer electrolyte membrane and the electrodes. In the case of plate pressing, a pressure of 10 MPa or less is preferable.

The decal substrate used in the application of the catalyst layer ink may be the same resin film or substrate as the substrate used in the formation of the polymer electrolyte membrane. Moreover, fluororesins such as polytetrafluoroethylene, an ethylene-tetrafluoroethylene copolymer, an ethylene-hexafluoropropylene copolymer, a tetrafluoroethylene-perfluoro (alkyl vinyl ether) copolymer, or polyvinylidene fluoride can be used. From the viewpoint of chemical stability and releasability in addition to heat resistance and solvent resistance, it is preferable to use a fluororesin film.

The catalyst layer may be dried by the same method as the method described in the above-mentioned drying of the mixed solution.

EXAMPLES

Hereinafter, the present invention will be more specifically described with reference to Examples, but the present invention is not limited to these examples.

Various measurement conditions are as follows.

(1) Molecular Weight of Polymer

The number average molecular weight and the weight average molecular weight of a polymer solution were measured by GPC. Using HLC-8022GPC manufactured by Tosoh Corporation as an integrated device of an ultraviolet detector and a differential refractometer, and using, as GPC columns, two TSKgel SuperHM-H columns (having an inner diameter of 6.0 mm and a length of 15 cm) manufactured by Tosoh Corporation, the measurement was performed with an N-methyl-2-pyrrolidone solvent (N-methyl-2-pyrrolidone solvent containing 10 mmol/L lithium bromide) at a flow rate of 0.2 mL/min, and the number average molecular weight and the weight average molecular weight were determined in terms of standard polystyrene.

(2) Ion Exchange Capacity (IEC)

The ion exchange capacity was measured in accordance with the following procedures [1] to [4] by the neutralization titration method. The measurement was performed three times, and the average of the three measurements was adopted.

[1] An electrolyte membrane was subjected to proton exchange and thoroughly washed with pure water, and water on the membrane surface was wiped off. Then, the electrolyte membrane was vacuum-dried at 100° C. for 12 hours or more, and the dry weight of the membrane was obtained.

[2] To the electrolyte membrane, 50 mL of a 5 wt % aqueous sodium sulfate solution was added, and the electrolyte membrane was left standing for 12 hours for ion exchange.

[3] The generated sulfuric acid was titrated using a 0.01 mol/L aqueous sodium hydroxide solution. A commercially available 0.1 w/v % phenolphthalein solution for titration was added as an indicator, and the point at which the solution turned pale red-purple was taken as the end point.

[4] The IEC was determined in accordance with the following formula.

IEC (meq/g)=[concentration (mmol/mL) of aqueous sodium hydroxide solution×dropping amount (mL) of aqueous sodium hydroxide solution]/ dry weight (g) of sample (3) Filling Rate of Hydrocarbon Polymer Electrolyte in Composite Layer (Filling Rate in Composite Layer)

A cross section of a composite electrolyte membrane was observed with an optical microscope or a scanning electron microscope (SEM), and the thickness of the composite layer including the polymer electrolyte and the fluorine-containing polymer porous substrate was defined as T1, and when other layers were provided outside the composite layer, thicknesses of the layers were defined as T2 and T3. The specific gravity of the polymer electrolyte forming the composite layer was defined as D1, the specific gravities of the polymer electrolyte forming the other layers outside the composite layer were defined as D2 and D3, and the specific gravity of the composite electrolyte membrane was defined as D. With the IECs of the polymers forming the layers being I1, I2, and I3, and the IEC of the composite electrolyte membrane being I, the filling rate Y2 (volume %) of the aromatic hydrocarbon polymer electrolyte in the composite layer was calculated by the following formula.

$Y2=[(T1+T2+T3)\times D\times I-(T2\times D2\times I2+T3\times D3\times I3)]/(T1\times D1\times I1)\times 100$ (4) Measurement of Dimension Change Rate ($\lambda_{xy}$) by Hot Water Test A composite electrolyte membrane was cut into a square piece of about 5 cm×about 5 cm, left standing for 24 hours in a temperature- and humidity-controlled atmosphere having a temperature of 23° C.±5° C. and a humidity of 50%±5%, and then the MD length and the TD length (MD1 and TD1) were measured with a caliper.

The composite electrolyte membrane was immersed in hot water at 80° C. for 8 hours, then the MD length and the TD length (MD2 and TD2) were measured again with a caliper, and the dimension change rates of MD and TD in the plane direction ($\lambda_{MD}$ and $\lambda_{TD}$) and the dimension change rate of the electrolyte membrane in the plane direction ($\lambda_{xy}$) (%) were calculated by the following formulae.

$$\lambda_{MD}=(MD2-MD1)/MD1\times100$$

$$\lambda_{TD}=(TD2-TD1)/TD1\times100$$

$$\lambda_{xy}=(\lambda_{MD}+\lambda_{TD})/2$$

(5) Proton Conductivity

An electrolyte membrane was immersed in pure water at 25° C. for 24 hours, and then held in a thermostat at 80° C. and a relative humidity of 25% RH for 30 minutes, and the proton conductivity of the sample was measured by a constant potential AC impedance method. The measurement device used was an electrochemical measuring system (Solartron 1287 Electrochemical Interface and Solartron 1255B Frequency Response Analyzer) manufactured by Solartron Analytical. The constant potential impedance was measured by a two-probe method to determine the proton conductivity. The AC amplitude was 50 mV. The sample used was a membrane having a width of 10 mm and a length of 50 mm. A measurement jig was produced from a phenol resin, and was opened at the measurement part. Two platinum plates (having a thickness of 100 μm) were used as electrodes. The electrodes were arranged on the front and back sides of the sample membrane with a distance between the electrodes of 10 mm so as to be parallel to each other and orthogonal to the longitudinal direction of the sample membrane.

(6) Production of Membrane Electrode Assembly (MEA) Using Composite Electrolyte Membrane A pair of commercially available electrodes, that is, gas diffusion electrodes for fuel cells "ELAT LT120ENSI" manufactured by BASF SE with 5 g/m² of Pt were each cut into a 5-cm square piece, and were stacked to face each other as a fuel electrode and an air electrode so as to sandwich a composite electrolyte membrane. Then, the resulting laminate was hot-pressed at 150° C. and 5 MPa for 3 minutes to produce an MEA for dry-wet cycle durability evaluation.

(7) Dry-Wet Cycle Durability

The MEA produced in the item (6) was set in a JAM standard cell Ex-1 (electrode area: 25 cm²) manufactured by Eiwa Corporation. At a cell temperature of 80° C., a cycle of supplying 160% RH nitrogen to both the electrodes for 2 minutes and then supplying 0% RH nitrogen (dew point: −20° C. or less) to both the electrodes for 2 minutes was repeated. The hydrogen permeation amount was measured at every 1,000 cycles, and the point at which the hydrogen permeation current exceeded 10 times the initial current was defined as the dry-wet cycle durability.

The hydrogen permeation amount was measured by supplying hydrogen as a fuel gas to one electrode and nitrogen to the other electrode, and conducting the test under humidification conditions of a 90% RH hydrogen gas and a 90% RH nitrogen gas. The MEA was held until the open circuit voltage reached 0.2 V or less, the voltage was swept from 0.2 to 0.7 V at 1 mV/sec, and the current value at 0.7 V was taken as the hydrogen permeation current.

(8) Measurement of Fluorine Atom Content in Fluorine-Containing Polymer Porous Substrate A fluorine-containing polymer porous substrate sample was weighed and burned in a combustion tube of an analyzer according to the following conditions, the generated gas was made to be absorbed in a solution, and part of the liquid having the gas absorbed therein was analyzed by ion chromatography.

<Combustion/Absorption Conditions>

System: AQF-2100H and GA-210 (manufactured by Mitsubishi Chemical Corporation)

Temperature of electric furnace: 900° C. at the inlet and 1,000° C. at the outlet Gas: Ar/$O_2$, 200 mL/min; 02, 400 mL/min Absorption liquid: $H_2O_2$ 0.1%, internal standard Br 8 μg/mL Volume of absorption liquid: 20 mL <Ion Chromatography/Anion Analysis Conditions>

System: ICS1600 (manufactured by Dionex)

Mobile phase: 2.7 mmol/L $Na_2CO_3$/0.3 mmol/L $NaHCO_3$

Flow rate: 1.50 mL/min

Detector: electrical conductivity detector

Injection volume: 20 μL (9) Chemical Structure Analysis of Surfactants

Chemical structures of various surfactants were analyzed by infrared spectroscopy (IR), $^1$H nuclear magnetic resonance (NMR) analysis, $^{19}$F NMR analysis, MALDI-MS analysis, and pyrolysis GC/MS analysis, and the contents of fluorine atoms and hydrophilic elements (total of oxygen, nitrogen, phosphorus, sulfur, and boron) were calculated.

(10) Measurement of Weight Average Molecular Weight of Surfactant

The weight average molecular weight of a surfactant was measured by gel permeation chromatography (GPC) analysis according to the following conditions.

Device: Gel Permeation Chromatograph GPC (Instrument No. GPC-27)

Detector: UV-visible absorption spectrophotometer UV (SPD-20AV manufactured by Shimadzu Corporation)

Column: TSKgel SuperHZM-N (two pieces)

SuperHZ4000, 2500, and 1000 (one piece each)

Solvent: tetrahydrofuran (THF)

Flow rate: 0.45 mL/min

Column temperature: 40° C.

Injection volume: 0.02 mL

Standard sample: monodisperse polyethylene glycol (PEG) manufactured by Tosoh Corporation and Agilent Technologies Japan, Ltd.

Data processing: GPC data processing system manufactured by Toray Research Center, Inc.

(11) Cross-Sectional SEM Measurement of Composite Electrolyte Membrane

A composite electrolyte membrane was subjected to cross-sectional SEM measurement according to the following conditions. In the obtained image, the central white area was regarded as a composite layer, and the black areas neighboring the white area were regarded as other external layers, and the thicknesses of the layers were measured.

Device: Field Emission Scanning Electron Microscope (FE-SEM) S-4800 (manufactured by Hitachi High-Technologies Corporation)

Accelerating voltage: 2.0 kV

Pretreatment: A cross-sectional sample produced by the BIB method was coated with Pt and subjected to the measurement.

BIB method: A cross-sectional sample production device based on an argon ion beam. A shielding plate was placed directly on the sample, and the sample was irradiated with a broad ion beam of argon for etching to produce an observation surface/analysis surface (cross section).

(12) Amount of Surfactant Contained in Electrolyte Membrane

An electrolyte membrane was weighed and burned in a combustion tube of an analyzer according to the following conditions, the generated gas was made to be absorbed in a solution, and part of the liquid having the gas absorbed therein was analyzed by ion chromatography. The contribution of the surfactant was calculated by excluding, from the analysis value, the contribution of the polymer electrolyte that did not contain the surfactant measured in advance and the contribution of the fluorine-containing polymer porous substrate measured in advance in the above-mentioned item (8), the amount of the surfactant contained in the composite electrolyte membrane was calculated from the amount of fluorine atoms included in the surfactant, and the ratio of the surfactant to the polymer electrolyte contained in the composite membrane (surfactant/polymer electrolyte) was determined.

<Combustion/Absorption Conditions>

System: AQF-2100H and GA-210 (manufactured by Mitsubishi Chemical Corporation)

Temperature of electric furnace: 900° C. at the inlet and 1,000° C. at the outlet Gas: $Ar/O_2$, 200 mL/min; 02, 400 mL/min Absorption liquid: $H_2O_2$ 0.1%, internal standard Br 8 μg/mL Volume of absorption liquid: 20 mL <Ion Chromatography/Anion Analysis Conditions>

System: ICS1600 (manufactured by DIONEX)

Mobile phase: 2.7 mmol/L $Na_2CO_3$/0.3 mmol/L $NaHCO_3$

Flow rate: 1.50 mL/min

Detector: electrical conductivity detector

Injection volume: 20 μL

(13) Measurement of Oxygen Content of Porous Substrate by XPS

A porous substrate cut into a 5-mm square piece in advance was rinsed with ultrapure water, dried at room temperature at 67 Pa for 10 hours, cooled with liquid nitrogen for 30 minutes, and subjected to treatment with a freezer mill for 5 minutes twice to prepare a sample. The composition of the prepared sample was measured, and the oxygen atom content of the sample was calculated. The measurement device and conditions are as follows.

Measurement device: Quantera SXM

Excited X-ray: monochromatic Al K $\alpha_1$, K $\alpha_2$ ray (1486.6 eV)

X-ray diameter: 200 μm

Photoelectron take-off angle: 45°

(14) Observation of Elastic Modulus Image by Cross-Sectional AFM

A cross-sectional AFM measurement was made according to the following conditions. The resulting image was analyzed, and the fractal dimension D was calculated. The fractal dimension D was determined in accordance with the method described in the following (15).

Device: scanning probe microscope (SPM) NanoScopeV Dimension Icon (manufactured by Bruker Corporation)

Probe: silicon cantilever

Operating mode: peak force tapping

Scanning range: the reinforcement layer was observed, in which the field of view was a square one side of which had a length obtained by subtracting both edges, 0.1 μm each, from the total thickness of the reinforcement layer (in cases where the reinforcement layer was 3 μm, the reinforcement layer was observed, in which the field was a 2.8-μm square formed by subtracting both edges from the reinforcement layer).

Scanning rate: 0.4 Hz

Measure environment: at room temperature in the air

Observed image: elastic modulus image

Observed field of view: the edges were removed by 3 cm, and five fields of view at regular intervals in the TD, including both ends (3 cm from the edge), were observed.

Pretreatment: A cross-sectional sample produced by the BIB method was coated with Pt and subjected to the measurement.

BIB method: A cross-sectional sample production device based on an argon ion beam. A shielding plate was placed directly on the sample, and the sample was irradiated with a broad ion beam of argon for etching to produce an observation surface/analysis surface (cross section).

(15) Calculation of Fractal Dimension D

The fractal dimension D was calculated in accordance with the following procedures [1] to [6]. The fractal dimension D was an average value calculated from the five fields of view of the cross-sectional AFM elastic modulus image observed in the above-mentioned (14).

Software used: Avizo (produced by Thermo Fisher Scientific Inc.), ImageJ (produced by NIH)

[1] The cross-sectional AFM elastic modulus image observed in the above-mentioned (14) was smoothed (smoothing).

[2] The resulting image was converted to an 8-bit grayscale.

[3] The electrolyte and the reinforcement material fibers were binarized by "Ohtsu's binarization".

FIG. 1 illustrates one example of a cross-sectional AFM image binarized. In FIG. 1, the white portion and the black portion represent the electrolyte and the reinforcement material respectively.

[4] The image binarized was divided by r=2, 3, 4, 6, 8, 12, 16, 32, 64 (pixels) in this order, and the small regions N(r) containing the electrolyte are counted.

[5] The relationship between r an N(r) was plotted in the form of a double-logarithmic chart.

[6] A straight line that satisfied N(r)=kr–D was determined by power approximation, and the fractal dimension D was calculated.

(16) Measurement of Mechanical Characteristics of Electrolyte Membrane in Dry State An electrolyte membrane as a specimen was set in a device, and subjected to a tensile test under the below-mentioned conditions. The values taken as tensile strength and tensile elongation were the values measured at the instant when the maximum point stress was exhibited in the test. The value of elastic modulus was the value determined so as to be the maximum, as calculated using any two points at which the difference in distortion was 0.3% in the measurement data. The yield stress was a value exhibited at the instant when the stress decreased by 0.5%, or a value at a 0.2% load bearing point in cases where the yield point was not exhibited clearly. The tensile strength, tensile elongation, tensile modulus, and yield stress were each calculated as the average value taken from five tests.

Measurement device: Autograph AG-IS (manufactured by Shimadzu Corporation)

Load range: 100N

Tension rate: 100 mm/min

Test piece: 10 mm wide×100 mm long

Distance between samples: 30 mm

Test temperature and humidity: 23±1° C., 50±10% RH

Number of tests: n=5

(17) Measurement of Mechanical Characteristics of Electrolyte Membrane in Wet State An electrolyte membrane as a specimen was cut to a test piece size in advance, and immersed in ultrapure water at 23° C. for 24 hours, and then, the electrolyte membrane was taken out of the ultrapure water. Within 10 minutes after the specimen was taken out, the specimen was subjected to a tensile test under the same conditions and by the same method as in the above-mentioned (16), and then, the wet tensile strength, wet tensile elongation, and wet tensile modulus were calculated.

(18) Calculation of Interfacial Crack Count C

The interfacial crack count C was calculated in accordance with the following procedures [1] to [3]. The interfacial crack count C is the total of the values obtained by performing the following on the five fields of view of the cross-sectional SEM image observed in the above-mentioned (11).

[1] In the above-mentioned (11), a portion 8 μm or more in the plane direction of the membrane in the TD cross-section was observed at a magnification of 15,000 times.

[2] As shown in FIG. 2, the number of interfacial cracks between the reinforcement layer and the monolayer was counted at a total of seven positions: the center of the image and the positions 1 μm, 2 μm, and 3 μm rightward and leftward from the center in the plane direction of the membrane. Here, the interfacial crack is defined as a 50-nm or larger gap existing at the interface between the reinforcement layer and the monolayer.

[3] The number of interfacial cracks was counted on the five images as above-mentioned, and the total of the numbers was regarded as the interfacial crack count C.

FIG. 2 illustrates one example of a method of determining whether there is any interfacial crack. In FIG. 2, 1 and 2 denote a reinforcement layer and an interfacial crack respectively.

Synthesis Example 1

Synthesis of 2,2-bis(4-hydroxyphenyl)-1,3-dioxolane (K-DHBP) Represented by the Following General Formula (G1)

In a 500-mL flask equipped with a stirrer, a thermometer, and a distillation tube, 49.5 g of 4,4'-dihydroxybenzophenone, 134 g of ethylene glycol, 96.9 g of trimethyl orthoformate, and 0.50 g of p-toluenesulfonic acid monohydrate were charged and dissolved. Then, the contents were kept warm and stirred at 78 to 82° C. for 2 hours. Further, the internal temperature was gradually raised to 120° C., and the contents were heated until the distillation of methyl formate, methanol, and trimethyl orthoformate completely stopped. After the reaction liquid was cooled to room temperature, the reaction liquid was diluted with ethyl acetate, the organic layer was washed with 100 mL of a 5% aqueous potassium carbonate solution, the resulting liquid was separated, and the solvent was distilled away. To the residue, 80 mL of dichloromethane was added to deposit crystals, and the crystals were filtered and dried to give 52.0 g of 2,2-bis(4-hydroxyphenyl)-1,3-dioxolane. The crystals were analyzed by GC, and it was found that the crystals were 99.9% of 2,2-bis(4-hydroxyphenyl)-1,3-dioxolane and 0.1% of 4,4'-dihydroxybenzophenone.

[Chemical Formula 5]

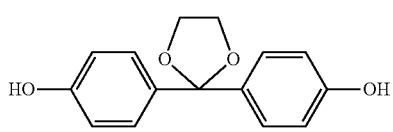

(G1)

Synthesis Example 2

Synthesis of di sodium-3,3'-disulfonate-4,4'-difluorobenzophenone Represented by the Following General Formula (G2)

In 150 mL of fuming sulfuric acid (50% $SO_3$) (a Wako Pure Chemical reagent), 109.1 g of 4,4'-difluorobenzophenone (an Aldrich reagent) was reacted at 100° C. for 10 hours. Then, the resulting product was gradually poured into a large amount of water, the resulting mixture was neutralized with NaOH, and then 200 g of sodium chloride (NaCl) was added to the mixture to precipitate a synthesized product. The obtained precipitate was filtered off and recrystallized from an aqueous ethanol solution to give the di sodium-3,3'-disulfonate-4,4'-difluorobenzophenone represented by the general formula (G2). The compound had a purity of 99.3%.

[Chemical Formula 6]

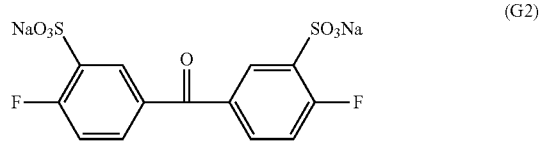

(G2)

Synthesis Example 3

Synthesis of Ionic Group-Free Oligomer a1 Represented by the Following General Formula (G3)

In a 1000-mL three-necked flask equipped with a stirrer, a nitrogen introduction tube, and a Dean-Stark trap, 16.59 g (120 mmol) of potassium carbonate (an Aldrich reagent), 25.8 g (100 mmol) of K-DHBP obtained in Synthesis Example 1, and 20.3 g (93 mmol) of 4,4'-difluorobenzophenone (an Aldrich reagent) were added. After nitrogen substitution, the contents were dehydrated in 300 mL of N-methylpyrrolidone (NMP) and 100 mL of toluene at 160° C., the temperature was raised to remove toluene, and the contents were polymerized at 180° C. for 1 hour. The resulting product was subjected to reprecipitation purification in a large amount of methanol to produce an ionic group-free oligomer (terminal: hydroxyl group). The oligomer had a number average molecular weight of 10,000.

In a 500-mL three-necked flask equipped with a stirrer, a nitrogen introduction tube, and a Dean-Stark trap, 1.1 g (8 mmol) of potassium carbonate (an Aldrich reagent) and 20.0 g (2 mmol) of the ionic group-free oligomer a1 (terminal: hydroxyl group) were added. After nitrogen substitution, the contents were dehydrated in 100 mL of N-methylpyrrolidone (NMP) and 30 mL of toluene at 100° C., the temperature was raised to remove toluene, 4.0 g (12 mmol) of decafluorobiphenyl (an Aldrich reagent) was added, and the contents were reacted at 105° C. for 1 hour. The resulting product was subjected to reprecipitation for purification in a large amount of isopropyl alcohol to produce an ionic group-free oligomer a1 (terminal: fluoro group) represented by the following formula (G3). The oligomer had a number average molecular weight of 11,000.

[Chemical Formula 7]

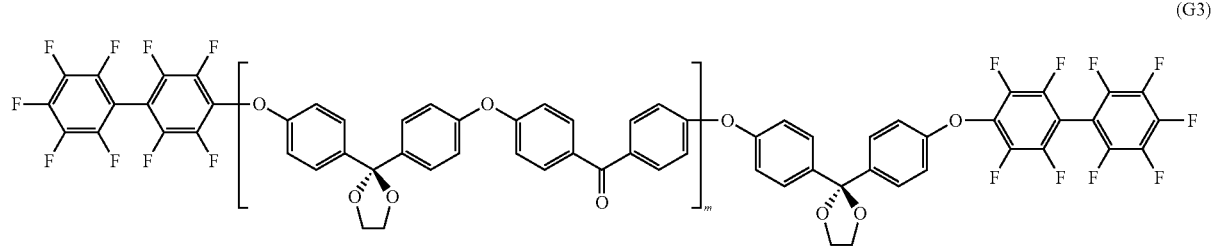

(G3)

Synthesis Example 4

Synthesis of Ionic Group-Containing Oligomer a2 Represented by the Following General Formula (G4)

In a 1000-mL three-necked flask equipped with a stirrer, a nitrogen introduction tube, and a Dean-Stark trap, 27.6 g (200 mmol) of potassium carbonate (an Aldrich reagent), 12.9 g (50 mmol) of K-DHBP obtained in Synthesis Example 1, 9.3 g (50 mmol) of 4,4'-biphenol (an Aldrich reagent), 39.3 g (93 mmol) of disodium-3,3'-disulfonate-4,4'-difluorobenzophenone obtained in Synthesis Example 2, and 17.9 g (82 mmol) of 18-crown-6 (Wako Pure Chemical Industries, Ltd.) were added. After nitrogen substitution, the contents were dehydrated in 300 mL of N-methylpyrrolidone (NMP) and 100 mL of toluene at 170° C., the temperature was raised to remove toluene, and the contents were polymerized at 180° C. for 1 hour. The resulting product was subjected to reprecipitation for purification in a large amount of isopropyl alcohol to produce an ionic group-containing oligomer a2 (terminal: hydroxyl group) represented by the following formula (G4). The oligomer had a number average molecular weight of 16,000.

(In the formula (G4), M represents H, Na, or K.)

Synthesis Example 5

Synthesis of neopentyl 3-(2,5-dichlorobenzoyl)benzenesulfonate Represented by the Following Formula (G5)

To a 3-L three-necked flask equipped with a stirrer and a cooling tube, 245 g (2.1 mol) of chlorosulfonic acid was added, subsequently 105 g (420 mmol) of 2,5-dichlorobenzophenone was added, and the contents were reacted in an oil bath at 100° C. for 8 hours. After a predetermined time, the reaction liquid was slowly poured into 1,000 g of crushed ice and extracted with ethyl acetate. The organic layer was washed with brine and dried over magnesium sulfate, and then ethyl acetate was distilled away to give light yellow crude crystals of 3-(2,5-dichlorobenzoyl)benzenesulfonic acid chloride. The crude crystals were used in the next step as they were without purification.

To 300 mL of pyridine, 41.1 g (462 mmol) of 2,2-dimethyl-1-propanol (neopentyl alcohol) was added, and the resulting mixture was cooled to about 10° C. The crude crystals obtained as described above were gradually added

[Chemical Formula 8]

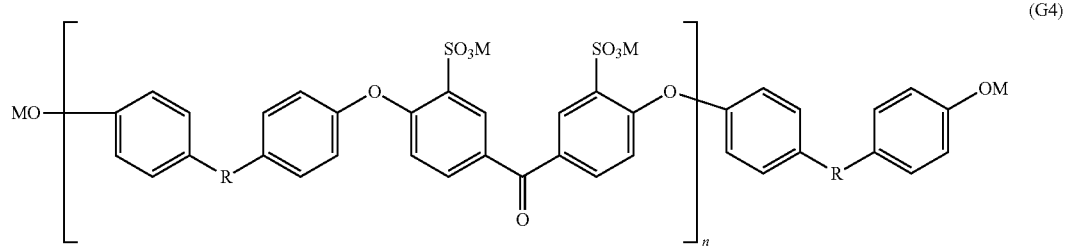

(G4)

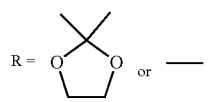

to the mixture over about 30 minutes. After all the crude crystals were added, the mixture was stirred for another 30 minutes to react. After the reaction, the reaction liquid was poured into 1,000 mL of aqueous hydrochloric acid, and the deposited solid was collected. The obtained solid was dissolved in ethyl acetate, the resulting solution was washed with an aqueous sodium hydrogen carbonate solution and brine and dried over magnesium sulfate, and ethyl acetate was distilled away to give crude crystals. The crude crystals were recrystallized from methanol to give white crystals of neopentyl 3-(2,5-dichlorobenzoyl)benzenesulfonate represented by the structural formula.

[Chemical Formula 9]

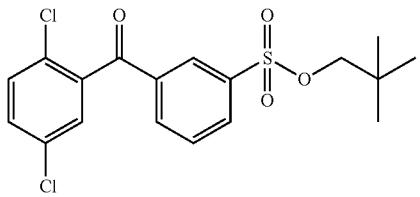

(G5)

Synthesis Example 6

Synthesis of Ionic Group-Free Oligomer Represented by the Following General Formula (G6)

In a 1-L three-necked flask equipped with a stirrer, a thermometer, a cooling tube, a Dean-Stark tube, and a three-way cock for introducing nitrogen, 49.4 g (0.29 mol) of 2,6-dichlorobenzonitrile, 88.4 g (0.26 mol) of 2,2-bis(4-hydroxyphenyl)-1,1,1,3,3,3-hexafluoropropane, and 47.3 g (0.34 mol) of potassium carbonate were weighed. After nitrogen substitution, 346 mL of sulfolane and 173 mL of toluene were added to the contents, and the resulting mixture was stirred. The flask was placed in an oil bath and heated to 150° C. for reflux. The water generated by the reaction was azeotropically distilled with toluene, and the reaction was continued with the water being removed to the out of the system with the Dean-Stark tube. As a result, generation of water almost ceased to be observed in about 3 hours. Most of toluene was removed with the reaction temperature being gradually raised, and then the reaction was continued at 200° C. for 3 hours. Then, 12.3 g (0.072 mol) of 2,6-dichlorobenzonitrile was added, and the reaction was performed for another 5 hours.

The obtained reaction liquid was allowed to cool, and then 100 mL of toluene was added for dilution. The by-produced inorganic compound precipitate was removed by filtration, and the filtrate was poured into 2 L of methanol. The precipitated product was filtered off, collected, dried, and then dissolved in 250 mL of tetrahydrofuran. The resulting solution was reprecipitated in 2 L of methanol to give 107 g of a target compound, that is, an oligomer, represented by the following general formula (G6). The oligomer had a number average molecular weight of 11,000.

[Chemical Formula 10]

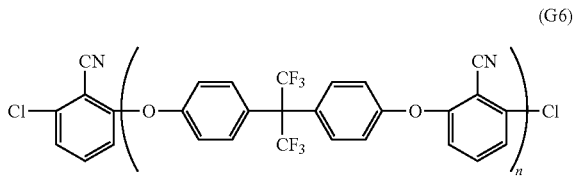

(G6)

Synthesis Example 7

Synthesis of Polyether Sulfone (PES) Block Copolymer Precursor b2' Including Segment Represented by the Following Formula (G8) and Segment Represented by the Following Formula (G9)

First, 1.62 g of anhydrous nickel chloride and 15 mL of dimethyl sulfoxide were mixed, and the mixture was adjusted to 70° C. To the mixture, 2.15 g of 2,2'-bipyridyl was added, and the resulting mixture was stirred at the same temperature for 10 minutes to prepare a nickel-containing solution.

In 5 mL of dimethyl sulfoxide, 1.49 g of (2,2-dimethylpropyl)2,5-dichlorobenzenesulfonate and 0.50 g of SUMIKA EXCEL PES5200P (manufactured by Sumitomo Chemical Company, Limited, Mn=40,000, Mw=94,000) represented by the following formula (G7) were dissolved, 1.23 g of a zinc powder was added to the resulting solution, and the resulting mixture was adjusted to 70° C. The nickel-containing solution was poured into the solution, and a polymerization reaction was performed at 70° C. for 4 hours. The reaction mixture was added to 60 mL of methanol, then 60 mL of 6 mol/L hydrochloric acid was added to the mixture, and the mixture was stirred for 1 hour. The deposited solid was separated by filtration and dried to give 1.62 g of an off-white block copolymer precursor b2' including the segments represented by the following formulae (G8) and (G9) in a yield of 99%. The block copolymer precursor had a weight average molecular weight of 230,000.

[Chemical Formula 11]

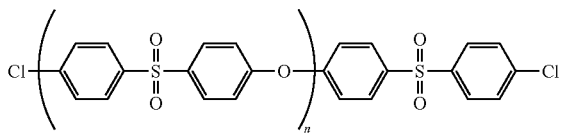

(G7)

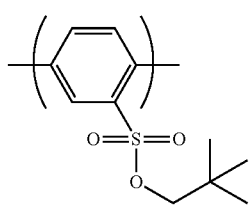

(G8)

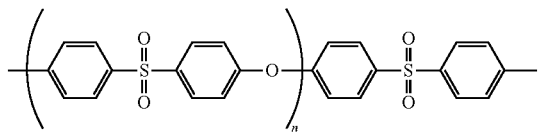

(G9)

[Polymer Electrolyte Solution A]

Polymer Electrolyte Solution Containing Block Copolymer Containing Oligomer Represented by the Formula (G4) as Ionic Group-Containing Segment, and Oligomer Represented by the Formula (G3) as Ionic Group-Free Segment In a 500-mL three-necked flask equipped with a stirrer, a nitrogen introduction tube, and a Dean-Stark trap, 0.56 g (4 mmol) of potassium carbonate (an Aldrich reagent) and 16 g (1 mmol) of the ionic group-containing oligomer a2 (terminal: hydroxyl group) obtained in Synthesis Example 4 were added. After nitrogen substitution, the contents were dehydrated in 100 mL of N-methylpyrrolidone (NMP) and 30 mL of cyclohexane at 100° C., the temperature was raised to remove cyclohexane, 11 g (1 mmol) of the ionic group-free oligomer a1 (terminal: fluoro group) obtained in Synthesis Example 3 was added, and the contents were reacted at 105° C. for 24 hours. The resulting product was subjected to reprecipitation purification in a large amount of isopropyl alcohol to produce a block copolymer b 1. The block copolymer had a weight average molecular weight of 340,000.

A 5 mass % N-methylpyrrolidone (NMP) solution in which the obtained block copolymer was dissolved, that is, a polymerization stock solution was directly centrifuged with an inverter/compact high speed refrigerated centrifuge (model number 6930 with angle rotor RA-800, 25° C., 30 minutes, centrifugal force: 20,000 G) manufactured by Kubota Corporation Co., Ltd. Since the sedimented solid matter (cake) and the supernatant liquid (coating liquid) were neatly separated, the supernatant liquid was collected.

[Polymer Electrolyte Solution B]

Polymer Electrolyte Solution Containing Polyarylene Block Copolymer Represented by the Following General Formula (G10)

To a mixture of 135.0 g (0.336 mol) of neopentyl 3-(2,5-dichlorobenzoyl)benzenesulfonate, 40.7 g (5.6 mmol) of the ionic group-free oligomer represented by the formula (G6) and synthesized in Synthesis Example 6, 6.71 g (16.8 mmol) of 2,5-dichloro-4'-(1-imidazolyl)benzophenone, 6.71 g (10.3 mmol) of bis(triphenylphosphine)nickel dichloride, 35.9 g (0.137 mol) of triphenylphosphine, 1.54 g (10.3 mmol) of sodium iodide, and 53.7 g (0.821 mol) of zinc, 540 mL of dried N,N-dimethylacetamide (DMAc) was added under nitrogen.

The reaction system was heated (finally warmed to 79° C.) with stirring and reacted for 3 hours. An increase in the viscosity of the system was observed during the reaction. The polymerization reaction solution was diluted with 730 mL of DMAc, stirred for 30 minutes, and filtered using Celite as a filter aid.

The filtrate was concentrated with an evaporator, 43.8 g (0.505 mol) of lithium bromide was added to the filtrate, and the resulting mixture was reacted at an internal temperature of 110° C. for 7 hours in a nitrogen atmosphere. After the reaction, the mixture was cooled to room temperature, poured into 4 L of acetone, and solidified. The solidified product was collected by filtration, air-dried, pulverized with a mixer, and washed with 1,500 mL of 1 N hydrochloric acid with stirring. After filtration, the product was washed with ion-exchanged water until the washing liquid came to have a pH of 5 or more, and then dried at 80° C. overnight to give 23.0 g of a target polyarylene block copolymer. The polyarylene block copolymer had a weight average molecular weight of 190,000 after the deprotection. The obtained polyarylene block copolymer was dissolved in an N-methyl-2-pyrrolidone/methanol=30/70 (mass %) organic solvent so that the resulting solution might have a concentration of 0.1 g/g to give a polymer electrolyte solution B. The polymer electrolyte solution B had a viscosity of 1,200 mPa·s.

[Chemical Formula 12]

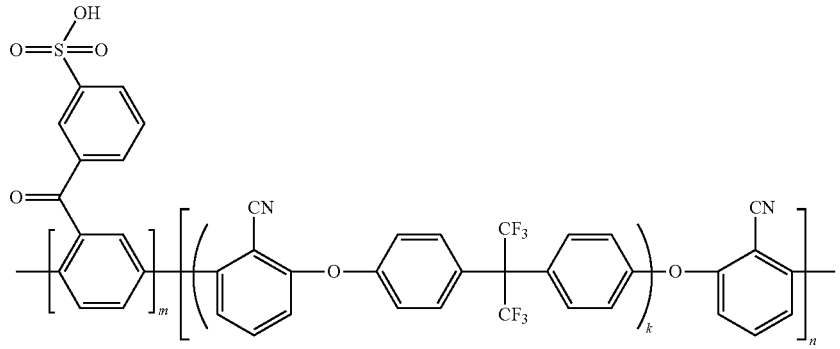

(G10)

Then, the liquid was distilled under reduced pressure at 80° C. with stirring, and pressure-filtered using a 1 μm polypropylene filter to give a polymer electrolyte solution A (polymer electrolyte concentration: 13 mass %). The polymer electrolyte solution A had a viscosity of 1,300 mPa·s.

[Polymer Electrolyte Solution C]

Polymer Electrolyte Solution C Containing Random Copolymer

In a 5-L reaction vessel equipped with a stirrer, a nitrogen introduction tube, and a Dean-Stark trap, 129 g of 2,2-bis (4-hydroxyphenyl)-1,3-dioxolane synthesized in Synthesis Example 1, 93 g of 4,4'-biphenol (an Aldrich reagent), and 422 g (1.0 mol) of disodium-3,3'-disulfonate-4,4'-difluorobenzophenone synthesized in Synthesis Example 2 were added. After nitrogen substitution, 3,000 g of N-methyl-2-pyrrolidone (NMP), 450 g of toluene, and 232 g of 18-crown-6 (a Wako Pure Chemical reagent) were added. After it was confirmed that all the monomers were dissolved, 304 g of potassium carbonate (an Aldrich reagent) was added to the solution, and the solution was dehydrated at 160° C. with refluxing, then the temperature was raised to remove toluene, and desalting polycondensation was performed at 200° C. for 1 hour. The resulting product had a weight average molecular weight of 320,000.

Then, the polymerization stock solution was diluted by the addition of NMP so that the polymerization stock solution might have a viscosity of 500 mPa·s, and was directly centrifuged with an inverter/compact high speed refrigerated centrifuge (model number 6930 with angle rotor RA-800, 25° C., 30 minutes, centrifugal force: 20,000 G) manufactured by Kubota Corporation Co., Ltd. Since the sedimented solid matter (cake) and the supernatant liquid (coating liquid) were neatly separated, the supernatant liquid was collected. Then, the liquid was distilled under reduced pressure at 80° C. with stirring to remove NMP until the polymer concentration reached 14 mass %, and pressure-filtered using a 5 μm polyethylene filter to give a polymer electrolyte solution C containing the random copolymer. The polymer electrolyte solution C had a viscosity of 1,000 mPa·s.

[Polymer Electrolyte Solution D]

Polymer Electrolyte Solution D Containing Polyether Sulfone Block Copolymer

To a mixed solution of 0.16 g of lithium bromide monohydrate and 8 mL of NMP, 0.23 g of the block copolymer precursor b2' obtained in Synthesis Example 7 was added, and the mixture was reacted at 120° C. for 24 hours. The reaction mixture was poured into 80 mL of 6 mol/L hydrochloric acid and stirred for 1 hour. The deposited solid was separated by filtration. The separated solid was dried to give an off-white block copolymer b2 including the segment represented by the formula (G8) and a segment represented by the following formula (G11). The obtained polyether sulfone block copolymer had a weight average molecular weight of 190,000. The obtained polyether sulfone block copolymer was dissolved in an N-methyl-2-pyrrolidone/methanol=30/70 (mass %) organic solvent so that the resulting solution might have a concentration of 0.1 g/g to give a polymer electrolyte solution D containing the polyether sulfone block copolymer. The polymer electrolyte solution D had a viscosity of 1,300 mPa·s.

[Chemical Formula 13]

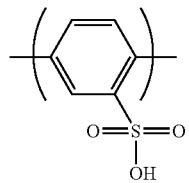

(G11)

[Polytetrafluoroethylene (ePTFE) Porous Substrate A]

"POREFLON" (registered trademark) HP-045-30 (manufactured by Sumitomo Electric Fine Polymer, Inc.) was biaxially stretched threefold in the longitudinal and transverse directions at once to produce an ePTFE porous substrate A having a film thickness of 8 μm and a porosity of 89%. The results of the SEM observation demonstrated that the porous substrate had a structure having an irregularly formed cobweb of fibrils having an average diameter of 0.3

[Hydrophilized ePTFE Porous Substrate A']

In a glove box having a dew point of −80° C., the ePTFE porous substrate B was immersed in a solution of 30 g of a 1% metallic sodium-naphthalene complex/tetrahydrofuran (THF) solution and 70 g of THF, pulled up after 3 seconds, and immediately thoroughly washed with THF to produce a hydrophilized ePTFE porous substrate A' having a film thickness of 8 μm and a porosity of 88%.

[Polytetrafluoroethylene (ePTFE) Porous Substrate B]

"POREFLON" (registered trademark) WP-010-80 (manufactured by Sumitomo Electric Fine Polymer, Inc.) was stretched 10-fold in the machine direction, and heat-treated at 365° C. Next, the film was stretched twofold in the transverse directions to produce an ePTFE porous substrate B having a film thickness of 9 μm and a porosity of 80%. The results of the SEM observation demonstrated that the porous substrate had a structure having nodes having an average diameter of 0.9 μm and generally in parallel in the longitudinal direction and fibrils having an average diameter of 0.2 μm and generally in parallel in the transverse direction.

[Tetrafluoroethylene-Hexafluoropropylene (FEP) Copolymer Porous Substrate C]

In a powder mixer, 75 parts by mass of an FEP resin (manufactured by Flon Industry Co., Ltd.) and 15 parts by mass of silica fine particles QSG-30 (manufactured by Shin-Etsu Chemical Co., Ltd.; the average primary particle diameter, 30 nm) as an inorganic filler were mixed well.

The mixture was kneaded using a twin-screw extruder TEM-35 (manufactured by Toshiba Machine Co., Ltd.) at 300° C., then extruded into a strand having a diameter of 2.5 mm, and the strand was cut into a length of 2.5 mm to produce a pellet.

The pellet was supplied to a single-screw extruder having a diameter of 40 mm (VS40 manufactured by Ikegai Corp.), and extruded at a die temperature of 333° C. and an extrusion speed of 4.3 kg/h using a flat die having a cap width of 700 mm. The discharged product was taken up on a roll adjusted to have a surface temperature of 130° C. at a speed of 4.8 m/min to give an ETFE film.

The obtained film was stretched four times in the longitudinal and transverse directions to produce an FEP copolymer porous substrate C having a film thickness of 8 μm and a porosity of 90%.

[Ethylene-Tetrafluoroethylene (ETFE) Copolymer Porous Substrate D]

An ETFE copolymer porous substrate D having a film thickness of 8 μm and a porosity of 89% was produced in the same manner as for the FEP porous substrate B except that an ETFE resin (manufactured by Sigma-Aldrich) was used instead of the FEP resin (manufactured by Flon Industry Co., Ltd.).

[Polytetrafluoroethylene (ePTFE) Porous Substrate E]

"POREFLON" (registered trademark) HP-045-30 (manufactured by Sumitomo Electric Fine Polymer, Inc.) was biaxially stretched fourfold in the longitudinal and transverse directions at once to produce an ePTFE porous substrate E having a film thickness of 6 μm and a porosity of 96%.

[Polytetrafluoroethylene (ePTFE) Porous Substrate F]

"Tetratex" (registered trademark) TX1356 (manufactured by Donaldson Company, Inc.) was used as a porous substrate F. The porous substrate had a film thickness of 8 µm and a porosity of 85%.

Production of Composite Electrolyte Membrane According to First Aspect

Example 1

In 100 g of the polymer electrolyte solution A, 0.26 g of "Ftergent" (registered trademark) 208G was dissolved to prepare an electrolyte-surfactant mixed solution having a mass ratio of the polymer electrolyte to the surfactant (hereinafter referred to as "surfactant/electrolyte") of 0.02. The electrolyte-surfactant mixed solution was applied to a glass substrate by cast coating using a knife coater, and the ePTFE porous substrate A was bonded to the glass substrate. The resulting laminate was held at room temperature for 1 hour to sufficiently impregnate the ePTFE porous substrate A with the electrolyte-surfactant mixed solution A, and then the laminate was dried at 100° C. for 4 hours. The electrolyte-surfactant mixed solution A was applied again to the upper surface of the dried membrane by cast coating, and the laminate was held at room temperature for 1 hour and then dried at 100° C. for 4 hours to produce a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (having a film thickness of 10 µm).

Example 2

A composite electrolyte membrane (having a film thickness of 10 µm) was obtained in the same manner as in Example 1 except that an electrolyte-surfactant mixed solution having a surfactant/electrolyte of 0.10 was used.

Example 3

A composite electrolyte membrane (having a film thickness of 10 µm) was obtained in the same manner as in Example 2 except that "Ftergent" (registered trademark) 710FM was used instead of "Ftergent" (registered trademark) 208G.

Example 4

A composite electrolyte membrane (having a film thickness of 10 µm) was obtained in the same manner as in Example 2 except that "MEGAFACE" (registered trademark) F-555 was used instead of "Ftergent" (registered trademark) 208G.

Example 5

A composite electrolyte membrane (having a film thickness of 10 µm) was obtained in the same manner as in Example 2 except that the ePTFE porous substrate B was used instead of the ePTFE porous substrate A.

Production of Composite Electrolyte Membrane According to Second Aspect

Example 6

"Ftergent" (registered trademark) 208G in an amount of 1.5 g was dissolved in 100 g of 2-methoxy-1-methylethyl acetate to prepare a solution of 1.5 mass % "Ftergent" (registered trademark) 208G. Then, the 208G solution was applied to an ePTFE porous substrate A fixed to a glass substrate by cast coating using a knife coater, and dried at 100° C. for 1 hour to produce a surfactant-containing ePTFE porous substrate A. The weight of the surfactant-containing ePTFE porous substrate A produced increased by 3 wt % compared with the original ePTFE porous substrate A.

The polymer electrolyte solution A was applied to another glass substrate by cast coating using a knife coater, and the surfactant-containing ePTFE porous substrate A separated from the foregoing glass substrate was bonded to the glass substrate. The resulting laminate was held at room temperature for 1 hour to sufficiently impregnate surfactant-containing ePTFE porous substrate A with the polymer electrolyte solution A, and then the laminate was dried at 100° C. for 4 hours. The polymer electrolyte solution A was applied again to the upper surface of the dried membrane by cast coating, and the laminate was held at room temperature for 1 hour and then dried at 100° C. for 4 hours to produce a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (having a film thickness of 10 µm).

Example 7

A composite electrolyte membrane (having a film thickness of 10 µm) was obtained in the same manner as in Example 6 except that the surfactant solution was applied so that the weight of the surfactant-containing ePTFE porous substrate A produced could increase by 6 wt % compared with the original ePTFE porous substrate A.

Example 8

A composite electrolyte membrane (having a film thickness of 10 µm) was obtained in the same manner as in Example 6 except that the surfactant solution was applied so that the weight of the surfactant-containing ePTFE porous substrate A produced could increase by 10 wt % compared with the original ePTFE porous substrate A.

Example 9

A composite electrolyte membrane (having a film thickness of 10 µm) was obtained in the same manner as in Example 7 except that "Ftergent" (registered trademark) 710FM was used instead of "Ftergent" (registered trademark) 208G.

Example 10

A composite electrolyte membrane (having a film thickness of 10 µm) was obtained in the same manner as in Example 7 except that "MEGAFACE" (registered trademark) F-555 was used instead of "Ftergent" (registered trademark) 208G.

Example 11

With 90 g of acetate 2-methoxy-1-methylethyl, 10 g of solution of 5 wt % polyvinylidene fluoride (PVDF) (L #9305 manufactured by Kureha Corporation) dissolved in NMP was mixed to prepare a solution of 0.5 wt % PVDF. A composite electrolyte membrane (having a film thickness of 10 μm) was obtained in the same manner as in Example 8 except that the PVDF solution prepared was used instead of the "Ftergent" (registered trademark) 208G solution.

Example 12

A composite electrolyte membrane (having a film thickness of 10 μm) was obtained in the same manner as in Example 7 except that the polymer electrolyte solution B was used instead of the polymer electrolyte solution A.

Example 13

A composite electrolyte membrane (having a film thickness of 10 μm) was obtained in the same manner as in Example 7 except that the polymer electrolyte solution C was used instead of the polymer electrolyte solution A.

Example 14

A composite electrolyte membrane (having a film thickness of 10 μm) was obtained in the same manner as in Example 7 except that the polymer electrolyte solution D was used instead of the polymer electrolyte solution A.

Example 15

A composite electrolyte membrane (having a film thickness of 10 μm) was obtained in the same manner as in Example 7 except that the porous substrate C was used instead of the ePTFE porous substrate A.

Example 16

A composite electrolyte membrane (having a film thickness of 10 μm) was obtained in the same manner as in Example 7 except that the porous substrate D was used instead of the ePTFE porous substrate A.

Example 17

A composite electrolyte membrane (having a film thickness of 10 μm) was obtained in the same manner as in Example 7 except that the porous substrate E was used instead of the ePTFE porous substrate A.

Example 18

An electrolyte-surfactant mixed solution was prepared in the same manner as in Example 1.

The electrolyte-surfactant mixed solution was applied to a glass substrate by cast coating using a knife coater, and the ePTFE porous substrate A was bonded to the glass substrate. The resulting laminate was held at room temperature for 1 hour to sufficiently impregnate the ePTFE porous substrate A with the electrolyte-surfactant mixed solution A, the electrolyte-surfactant mixed solution A was then applied again by cast coating, and the resulting laminate was held at room temperature for 1 hour and then dried at 100° C. for 4 hours to produce a film-like polymer. After being immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (having a film thickness of 10 μm).

Example 19

A composite electrolyte membrane (having a film thickness of 10 μm) was obtained in the same manner as in Example 18 except that an electrolyte-surfactant mixed solution having a surfactant/electrolyte of 0.04 was used.

Example 20

A composite electrolyte membrane (having a film thickness of 10 μm) was obtained in the same manner as in Example 1 except that an electrolyte-surfactant mixed solution having a surfactant/electrolyte of 0.04 was used, and that the ePTFE porous substrate F was used instead of the ePTFE porous substrate A.

Example 21

A composite electrolyte membrane (having a film thickness of 10 μm) was obtained in the same manner as in Example 19 except that the ePTFE porous substrate F was used instead of the ePTFE porous substrate A.

Example 22

An electrolyte/surfactant mixed solution was prepared in the same manner as in Example 19.

A PET substrate was coated with the electrolyte-surfactant mixed solution, the ePTFE porous substrate F was bonded onto the solution-coated membrane, the upper face of the substrate was then coated with the electrolyte-surfactant mixed solution, and the resulting laminate was dried in a drying oven at 100° C. for 10 minutes to produce a film-like polymer. FIG. 3 illustrates a schematic diagram of a roll membrane production apparatus used. In FIGS. 3, 3, 4, 5, and 6 denote a PET substrate, a coating device, a reinforcement material, and a drying oven respectively. After the resulting film-like polymer was immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (having a film thickness of 10 μm).

Example 23

A composite electrolyte membrane (having a film thickness of 10 μm) was obtained in the same manner as in Example 22 except that "Ftergent" (registered trademark) FTX-218 was used instead of "Ftergent" (registered trademark) 208G.

Comparative Example 1

An attempt was made to produce a composite electrolyte membrane in the same manner as in Example 1 except that the polymer electrolyte solution A was used instead of the electrolyte-surfactant mixed solution, but the polymer electrolyte solution A did not penetrate into the ePTFE porous substrate A, and no composite electrolyte membrane was obtained.

Comparative Example 2

A composite electrolyte membrane (having a film thickness of 10 μm) was obtained in the same manner as in Comparative Example 1 except that the hydrophilized ePTFE porous substrate A' was used instead of the ePTFE porous substrate A.

The composite electrolyte membranes produced in Examples 1 to 16 and Comparative Examples 1 to 2 were evaluated for the ion exchange capacity (IEC), filling rate of the polymer electrolyte in the composite layer, fractal dimension D, dimension change rate $\lambda_{xy}$, wet tensile modulus, proton conductivity, and dry-wet cycle durability. In addition, the fluorine-containing polymer microporous film porous substrate was evaluated for the fluorine atom content and the porosity. The evaluation results are shown in Table 1. (As for the dry-wet cycle durability, when the hydrogen permeation current did not exceed 10 times the initial current even after 30,000 cycles, the evaluation was terminated at 30,000 cycles.)

Comparative Example 3

A composite electrolyte membrane (having a film thickness of 10 μm) was obtained in the same manner as in Example 1 except that "Ftergent" (registered trademark) FTX-218 was used instead of "Ftergent" (registered trademark) 208G.

Comparative Example 4

An electrolyte/surfactant mixed solution was prepared in the same manner as in Example 19.

A PET substrate was coated with the electrolyte-surfactant mixed solution, the ePTFE porous substrate F was bonded onto the solution-coated membrane, the resulting laminate was dried in a drying oven at 100° C. for 10 minutes, and the membrane dried was wound up. The upper face of the membrane wound up was coated with the electrolyte-surfactant mixed solution, and the resulting laminate was dried in a drying oven at 100° C. for 10 minutes to produce a film-like polymer. FIG. 4 illustrates a schematic diagram of a roll membrane production apparatus used. In FIGS. 4, 3, 4, 5, and 6 denote a PET substrate, a coating device, a reinforcement material, and a drying oven respectively. After the resulting film-like polymer was immersed in a 10 mass % aqueous sulfuric acid solution at 80° C. for 24 hours for proton exchange and a deprotection reaction, the polymer was immersed in a large excess amount of pure water for 24 hours and thoroughly washed to give a composite electrolyte membrane (having a film thickness of 10 μm).

TABLE 1

| | Polymer Electrolyte Solution | | | Porous Substrate | | | Coating | |
| --- | --- | --- | --- | --- | --- | --- | --- | --- |
| | Type of Polymer Electrolyte Solution [Note 1] | Surfactant | Surfactant/ Polymer Electrolyte (mass ratio) | Type of Reinforcing Member [Note 2] | Fluorine Atom Content (%) | Oxygen Atom Content (%) | Porosity (%) | Fluorinated Surfactant | Agent/ Porous Substrate (mass ratio) |
| Example 1 | A | "FTERGENT" (Registered Trademark) 208G | 0.02 | A | 76 | 0 | 89 | — | — |
| Example 2 | A | "FTERGENT" (Registered Trademark) 208G | 0.10 | A | 76 | 0 | 89 | — | — |
| Example 3 | A | A | 0.10 | A | 76 | 0 | 89 | — | — |
| Example 4 | A | "MEGAFAC" (Registered Trademark) F-555 | 0.10 | A | 76 | 0 | 89 | — | — |
| Example 5 | A | "FTERGENT" (Registered Trademark) 208G | 0.10 | B | 76 | 0 | 80 | — | — |
| Example 6 | A | — | — | A | 76 | 0 | 89 | "FTERGENT" (Registered Trademark) 208G | 0.03 |
| Example 7 | A | — | — | A | 76 | 0 | 89 | "FTERGENT" (Registered Trademark) 208G | 0.06 |
| Example 8 | A | — | — | A | 76 | 0 | 89 | "FTERGENT" (Registered Trademark) 208G | 0.1 |
| Example 9 | A | — | — | A | 76 | 0 | 89 | "FTERGENT" (Registered Trademark) 710FM | 0.06 |
| Example 10 | A | — | — | A | 76 | 0 | 89 | "MEGAFAC" (Registered Trademark) F-555 | 0.06 |
| Example 11 | A | — | — | A | 76 | 0 | 89 | PVDF | 0.10 |
| Example 12 | B | — | — | A | 76 | 0 | 89 | "FTERGENT" (Registered Trademark) 208G | 0.06 |

TABLE 1-continued

| | | | | | | | | | |
|---|---|---|---|---|---|---|---|---|---|
| Example 13 | C | — | — | A | 76 | 0 | 89 | "FTERGENT" (Registered Trademark) 208G | 0.06 |
| Example 14 | D | — | — | A | 76 | 0 | 89 | "FTERGENT" (Registered Trademark) 208G | 0.06 |

| | Membrane-Forming Method | | | Filing Rate of | | Dimension Change | Wet | | Interface | Dry-Wet |
|---|---|---|---|---|---|---|---|---|---|---|
| | Membrane-Forming Method | Drying Times | IEC (meq/g) | Composite Layer (%) | Fractal Dimension D | Rate $\lambda_{xy}$ (%) | Tensile Modulus (N/cm) | Proton Conductivity (mS/cm) | Crack Numbers C | Cycle Durability (times) |
| Example 1 | Batch | 2 | 1.86 | 87 | 1.75 | 4 | 75 | 2.7 | 7 | >30000 |
| Example 2 | Batch | 2 | 1.70 | 88 | 1.73 | 4 | 77 | 2.5 | — | >30000 |
| Example 3 | Batch | 2 | 1.68 | 84 | 1.72 | 4 | 77 | 2.4 | — | >30000 |
| Example 4 | Batch | 2 | 1.65 | 82 | 1.70 | 5 | 73 | 2.2 | — | >30000 |
| Example 5 | Batch | 2 | 1.55 | 79 | 1.71 | 3 | 50 | 2.3 | — | >30000 |
| Example 6 | Batch | 2 | 1.83 | 84 | 1.82 | 4 | 76 | 2.9 | 5 | >30000 |
| Example 7 | Batch | 2 | 1.80 | 82 | 1.80 | 4 | 77 | 2.8 | — | >30000 |
| Example 8 | Batch | 2 | 1.76 | 80 | 1.77 | 4 | 75 | 2.6 | — | >30000 |
| Example 9 | Batch | 2 | 1.78 | 80 | 1.81 | 4 | 76 | 2.8 | — | >30000 |
| Example 10 | Batch | 2 | 1.76 | 79 | 1.76 | 4 | 74 | 2.5 | — | >30000 |
| Example 11 | Batch | 2 | 1.74 | 75 | 1.72 | 3 | 80 | 2.0 | — | >30000 |
| Example 12 | Batch | 2 | 1.60 | 81 | 1.72 | 7 | 76 | 0.6 | — | >30000 |
| Example 13 | Batch | 2 | 1.71 | 80 | 1.71 | 8 | 75 | 0.4 | — | 20000 |
| Example 14 | Batch | 2 | 1.53 | 81 | 1.73 | 5 | 76 | 0.5 | — | >30000 |

Note 1)
A: block copolymer b1, B: polyarylene block copolymer, C: random copolymer, D: polyether sulfone block copolymer b2

Note 2)
A: polytetrafluoroethylene (ePTFE) porous substrate, B: polytetrafluoroethylene (ePTFE) porous substrate B

TABLE 2

| | Polymer Electrolyte Solution | | Surfactant/ Polymer Electrolyte (mass ratio) | Porous Substrate | | | | | Coating Agent/Porous Substrate (mass ratio) |
|---|---|---|---|---|---|---|---|---|---|
| | Type of Polymer Electrolyte Solution[Note 1] | Surfactant | | Type of Reinforcing Material[Note 2] | Fluorine Atom Content (%) | Oxygen Atom Content (%) | Porosity (%) | Fluorinated Surfactant | |
| Example 15 | A | — | — | C | 76 | 7.8 | 90 | "FTERGENT" (Registered Trademark) 208G | 0.06 |
| Example 16 | A | — | — | D | 59 | 7.8 | 89 | "FTERGENT" (Registered Trademark) 208G | 0.06 |
| Example 17 | A | — | — | E | 76 | 0 | 96 | "FTERGENT" (Registered Trademark) 208G | 0.06 |
| Example 18 | A | "FTERGENT" (Registered Trademark) 208G | 0.02 | A | 76 | 0 | 89 | — | — |
| Example 19 | A | "FTERGENT" (Registered Trademark) 208G | 0.04 | A | 76 | 0 | 89 | — | — |
| Example 20 | A | "FTERGENT" (Registered Trademark) 208G | 0.04 | F | — | — | 85 | — | — |
| Example 21 | A | "FTERGENT" (Registered Trademark) 208G | 0.04 | F | — | — | 85 | — | — |
| Example 22 | A | "FTERGENT" (Registered Trademark) 208G | 0.04 | F | — | — | 85 | — | — |
| Example 23 | A | FTERGENT (Registered Trademark) 218 | 0.04 | F | — | — | 85 | — | — |
| Comparative Example 1 | A | — | — | A | 76 | 0 | 89 | — | — |
| Comparative Example 2 | A | — | — | A' | 63 | 17.5 | 89 | — | — |

TABLE 2-continued

| | | | | | | | | | | |
|---|---|---|---|---|---|---|---|---|---|---|
| Comparative Example 3 | A | FTERGENT (Registered Trademark) 218 | 0.02 | A | 76 | 0 | 89 | — | — | |
| Comparative Example 4 | A | "FTERGENT" (Registered Trademark) 208G | 0.04 | F | — | — | 89 | — | — | |

| | Membrane-Forming Method | | | Filing Rate of | | Dimension Change | Wet | | Interface | Dry-Wet |
|---|---|---|---|---|---|---|---|---|---|---|
| | Membrane-Forming Method | Drying Times | IEC (meq/g) | Composite Layer (%) | Fractal Dimension D | Rate $\lambda_{xy}$ (%) | Tensile Modulus (N/cm) | Proton Conductivity (mS/cm) | Crack Numbers C | Cycle Durability (times) |
| Example 15 | Batch | 2 | 1.85 | 87 | 1.80 | 5 | 40 | 2.7 | | >30000 |
| Example 16 | Batch | 2 | 1.85 | 87 | 1.79 | 7 | 45 | 2.7 | | 26000 |
| Example 17 | Batch | 2 | 1.92 | 92 | 1.90 | 7 | 18 | 3.1 | | 26000 |
| Example 18 | Batch | 1 | 1.85 | 88 | 1.77 | 3 | 77 | 2.8 | 1 | >30000 |
| Example 19 | Batch | 1 | 1.80 | 88 | 1.76 | 3 | 77 | 2.8 | 0 | >30000 |
| Example 20 | Batch | 2 | 1.81 | 86 | 1.73 | 2 | 52 | 2.5 | 3 | >30000 |
| Example 21 | Batch | 1 | 1.81 | 88 | 1.76 | 2 | 55 | 2.7 | 1 | >30000 |
| Example 22 | Roll | 1 | 1.81 | 89 | 1.81 | 2 | 57 | 2.8 | 0 | >30000 |
| Example 23 | Roll | 1 | 1.80 | 84 | 1.77 | 2 | 52 | 2.7 | 0 | >30000 |
| Comparative Example 1 | Batch | 2 | — | — | — | — | — | — | — | — |
| Comparative Example 2 | Batch | 2 | 1.53 | 72 | 1.65 | 4 | 15 | 1.9 | — | 22000 |
| Comparative Example 3 | Batch | 2 | 1.86 | 87 | 1.67 | 4 | 75 | 2.7 | 7 | >30000 |
| Comparative Example 4 | Roll | 2 | 1.85 | 88 | 1.55 | 3 | 76 | 2.0 | 15 | 22000 |

Note 1)
A: block copolymer b1

Note 2)
A: polytetrafluoroethylene (ePTFE) porous substrate, A': hydrophilized ePTFE porous substrate A', C: tetrafluoroethylene-hexafluoropropylene (FEP) copolymer porous substrate, D: ethylene-tetrafluoroethylene (ETFE) copolymer porous substrate, E: polytetrafluoroethylene (ePTFE) porous substrate E, F: polytetrafluoroethylene (ePTFE) porous substrate F

INDUSTRIAL APPLICABILITY

The composite electrolyte membrane of the present invention can be applied to various uses. For example, the electrolyte membrane can be applied to medical uses such as artificial skin, filtration uses, ion-exchange resin uses such as chlorine-resistant reverse osmosis membranes, various structural material uses, electrochemical uses, humidifying membranes, antifogging films, antistatic films, deoxidation films, solar battery films, and gas barrier films. Above all, the electrolyte membrane can be more preferably used in various electrochemical uses. Examples of the electrochemical uses include polymer electrolyte fuel cells, redox flow batteries, water electrolysis apparatuses, chlor-alkali electrolysis apparatuses, electrochemical hydrogen pumps, and water electrolysis hydrogen generators.

In the polymer electrolyte fuel cell, electrochemical hydrogen pump, or water electrolysis hydrogen generator, the polymer electrolyte membrane is used in a state where a catalyst layer, an electrode substrate, and a separator are sequentially stacked on either side of the electrolyte membrane. Among these, an electrolyte membrane on both sides of which a catalyst layer is laminated (that is, a laminate having a layer structure of catalyst layer/electrolyte membrane/catalyst layer) is referred to as a "catalyst coated membrane (CCM)". Further, a laminate including a catalyst layer and a gas diffusion substrate sequentially stacked on either side of the electrolyte membrane (that is, a laminate having a layer structure of gas diffusion substrate/catalyst layer/electrolyte membrane/catalyst layer/gas diffusion substrate) is referred to as a "membrane electrode assembly (MEA)". The composite electrolyte membrane of the present invention is suitably used as an electrolyte membrane that constitutes such a CCM or MEA.

REFERENCE SIGNS LIST

1: Reinforcement layer
2: Interfacial crack
3: PET substrate
4: Coating device
5: Reinforcement material
6: Drying oven

The invention claimed is:

1. A composite electrolyte membrane comprising a composite layer that is a composite of a hydrocarbon polymer electrolyte and a fluorine-containing polymer porous substrate, wherein
the fluorine-containing polymer porous substrate has an oxygen atom content of 0 mass %,
the fluorine-containing polymer porous substrate has a fluorine atom content of 70 mass % or more,
the fluorine-containing polymer contained in the porous substrate includes polytetrafluoroethylene (PTFE), polyhexafluoropropylene, a tetrafluoroethylene-hexafluoropropylene copolymer (FEP), an ethylene-tetrafluoroethylene copolymer (ETFE) polyvinylidene difluoride (PVDF), polychlorotrifluoroethylene (PCTFE), a perfluoroalkoxy fluororesin (PFA), or an ethylene-chlorotrifluoroethylene copolymer (ECTFE),
a porosity YI of the porous substrate defined as a value calculated by the following mathematical formula is 50 to 98 volume %
$Y1 = (1 - Db/Da) \times 100$
wherein Da is the specific gravity of the polymer that constitutes the fluorine-containing polymer porous substrate, and
Db is the specific gravity of the entire fluorine-containing polymer porous substrate, and a fractal dimension D exhibiting the distribution of the hydrocarbon polymer electrolyte and the fluorine-containing polymer porous substrate in the composite layer is 1.70 or more.

2. The composite electrolyte membrane according to claim 1, having a wet tensile modulus of 20 N/cm or more.

3. The composite electrolyte membrane according to claim 1, wherein the hydrocarbon polymer electrolyte is an ionic group-containing aromatic hydrocarbon polymer.

4. The composite electrolyte membrane according to claim 3, wherein the ionic group-containing aromatic hydrocarbon polymer is a block copolymer having at least one ionic group-containing segment (A1) and at least one ionic group-free segment (A2).

5. The composite electrolyte membrane according to claim 1, comprising at least a fluorinated surfactant or polyvinylidene fluoride as an additive.

6. The composite electrolyte membrane according to claim 5, wherein the additive is unevenly distributed in the composite layer.

7. A catalyst coated membrane comprising the composite electrolyte membrane according to claim 1, and a catalyst layer laminated on the composite electrolyte membrane.

8. A membrane electrode assembly comprising the composite electrolyte membrane according to claim 1.

9. A polymer electrolyte fuel cell comprising the composite electrolyte membrane according to claim 1.

10. A method of producing the composite electrolyte membrane according to claim 1, comprising:

step 1: impregnating the fluorine-containing polymer porous substrate with a solution containing a solvent and a fluorinated surfactant or a solvent and polyvinylidene fluoride, and removing the solvent; and step 2: impregnating the fluorine-containing polymer porous substrate obtained in step 1 with a solution containing a solvent and the hydrocarbon polymer electrolyte, and removing the solvent.

11. The method of producing the composite electrolyte membrane according to claim 10, wherein the step 1 is impregnating the fluorine-containing polymer porous substrate with the solution containing the solvent and the fluorinated surfactant, and removing the solvent.

* * * * *